(12) United States Patent
Shelestak et al.

(10) Patent No.: US 6,413,893 B1
(45) Date of Patent: Jul. 2, 2002

(54) GREEN PRIVACY GLASS

(75) Inventors: Larry J. Shelestak, Bairdford; Robert B. Heithoff, Gibsonia; Andrew Calabrese, Wexford; John F. Krumwiede, Cheswick; Anthony V. Longobardo, Mt. Pleasant, all of PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/389,840

(22) Filed: Sep. 3, 1999

Related U.S. Application Data

(63) Continuation-in-part of application No. 08/869,221, filed on Jun. 4, 1997, now abandoned.
(60) Provisional application No. 60/021,034, filed on Jul. 2, 1996.

(51) Int. Cl.[7] .............................. C03C 3/087; C03C 4/08
(52) U.S. Cl. ..................... 501/71; 501/904; 501/905; 501/70
(58) Field of Search .................... 501/70, 71, 904, 501/905

(56) References Cited

U.S. PATENT DOCUMENTS

| | | | |
|---|---|---|---|
| 4,101,705 A | 7/1978 | Fischer et al. | 428/220 |
| 4,104,076 A | 8/1978 | Pons | 106/52 |
| 4,190,452 A | 2/1980 | Fischer et al. | 106/52 |
| 4,339,541 A | 7/1982 | Dela Ruye | 501/71 |
| 4,381,934 A | 5/1983 | Kunkle et al. | 65/135 |
| 4,661,381 A | 4/1987 | Callies et al. | 427/255 |
| 4,735,861 A | 4/1988 | Carlson | 428/432 |
| 4,792,536 A | 12/1988 | Pecoraro et al. | 501/70 |
| 4,835,040 A | 5/1989 | Callies et al. | 428/215 |
| 4,873,206 A | 10/1989 | Jones | 501/71 |
| 4,886,539 A | 12/1989 | Cerutti et al. | 65/135 |
| 5,023,210 A | 6/1991 | Krumwiede et al. | 501/71 |
| 5,030,593 A | 7/1991 | Heithoff | 501/72 |
| 5,278,108 A | 1/1994 | Cheng et al. | 501/71 |
| 5,308,805 A | 5/1994 | Baker et al. | 501/71 |
| 5,318,931 A | 6/1994 | Nakaguchi et al. | 501/64 |
| 5,346,867 A | 9/1994 | Jones et al. | 501/71 |
| 5,352,640 A | 10/1994 | Combes et al. | 501/71 |
| 5,385,593 A | 1/1995 | Longobardo | 65/17.1 |
| 5,393,593 A | 2/1995 | Gulotta et al. | 428/220 |
| 5,411,922 A | 5/1995 | Jones | 501/71 |
| 5,478,783 A | 12/1995 | Higby et al. | 501/27 |
| 5,521,128 A | 5/1996 | Jones et al. | 501/27 |
| 5,523,263 A | 6/1996 | Penrod | 501/27 |
| 5,545,596 A | 8/1996 | Casariego et al. | 501/71 |
| 5,565,388 A | 10/1996 | Krumwiede et al. | 501/70 |
| 5,582,455 A | 12/1996 | Casariego et al. | 296/146.2 |
| 5,641,716 A | 6/1997 | Higby et al. | 501/27 |
| 5,650,365 A | 7/1997 | Higby et al. | 501/71 |
| 5,656,559 A | 8/1997 | Combes et al. | 501/70 |
| 5,837,629 A | 11/1998 | Combes et al. | |
| 5,932,502 A | * 8/1999 | Longobardo et al. | 501/71 |

FOREIGN PATENT DOCUMENTS

| | | |
|---|---|---|
| CA | 2148954 | 11/1995 |
| DE | 26 52 445 | 5/1977 |
| DE | 19517121 | 11/1995 |
| DE | 19636303 | 3/1997 |
| EP | 0 536 049 | 4/1993 |
| EP | 0 653 387 | 5/1995 |
| EP | 0 653 388 | 5/1995 |
| EP | 0 705 800 | 10/1995 |
| EP | 0 688 741 | 12/1995 |
| EP | 0 452 207 | 10/1996 |
| EP | 0 798 271 | 10/1997 |
| EP | 0 802 168 | 10/1997 |
| EP | 0 816 296 | 1/1998 |
| EP | 0 936 197 | 8/1999 |
| FR | 2331527 | 11/1975 |
| FR | 2660921 | 10/1991 |
| FR | 2682101 | 4/1993 |

(List continued on next page.)

OTHER PUBLICATIONS

Bamford, C. R., "Colour Generation and Control in Glass", Glass Science and Technology, 2, 1977; pp. 52–54. (no month).

Primary Examiner—Michael Marcheschi
(74) Attorney, Agent, or Firm—Kenneth J. Stachel; Andrew C. Siminerio

(57) ABSTRACT

The present invention provides a green colored, infrared and ultraviolet absorbing glass article having a luminous transmittance of up to 60 percent. The composition of the glass article uses a standard soda-lime-silica glass base composition and additionally iron, cobalt, selenium, and chromium, and titanium, as infrared and ultraviolet radiation absorbing materials and colorants. The glasses of the present invention have a color characterized by a dominant wavelength in the range of about 480 to 565 nanometers, preferably about 495 to 560 nanometers, with an excitation purity of no higher than about 20 percent, preferably no higher than about 10 percent, and more preferably no higher than about 7 percent. The glass compositions may be provided with different levels of spectral performance depending on the particular application and desired luminous transmittance. In one embodiment of the invention, the green colored glass composition in addition to the soda-lime-silica glass base composition has the solar radiation absorbing and colorant portion of about 0.60 to 4 percent by weight total iron, about 0.13 to 0.9 percent by weight FeO, about 40 to 500 PPM CoO, about 5 to 70 PPM Se, about 15 to 800 PPM $Cr_2O_3$, and about 0.02 to 1 percent by weight $TiO_2$. In another embodiment of the invention, the glass composition of the article includes a solar radiation absorbing and colorant portion of 1 to less than 1.4 percent by weight total iron, about 0.2 to 0.6 percent by weight FeO, greater than 200 to about 500 PPM CoO, about 5 to 70 PPM Se, greater than 200 to about 800 PPM $Cr_2O_3$, and 0 to about 1 percent by weight $TiO_2$.

52 Claims, No Drawings

FOREIGN PATENT DOCUMENTS

| | | |
|---|---|---|
| FR | 2719838 | 11/1995 |
| FR | 2721599 | 12/1995 |
| FR | 2731696 | 9/1996 |
| GB | 2 162 835 | 2/1986 |
| GB | 2 289 273 | 11/1995 |
| JP | 61-136936 | 6/1986 |
| JP | 6-247740 | 9/1994 |
| WO | 94/18135 | 8/1994 |
| WO | 96/00194 | 1/1996 |
| WO | 96/28394 | 9/1996 |
| WO | 99/28254 | 6/1999 |

* cited by examiner

GREEN PRIVACY GLASS

CROSS REFERENCE TO RELATED APPLICATION

This application is a continuation-in-part of U.S. application Ser. No. 08/869,221 filed Jun. 4, 1997, now abandoned, which claimed the benefit of U.S. Provisional Application No. 60/021,034, filed Jul. 2, 1996.

BACKGROUND OF THE INVENTION

This invention relates to a tinted, green colored soda-lime-silica glass having a low luminous transmittance that makes it highly desirable for use as a privacy glazing in vehicles, such as the side and rear windows in vans. In particular, the glass has a luminous transmittance of 60% or less, preferably between about 10 to 40%. As used herein, the term "green colored" is meant to include glasses that have a dominant wavelength of about 480 to 565 nanometers (nm) and may be characterized as green blue, green yellow or green gray in color. In addition, the glass of the present invention generally exhibits lower infrared and ultraviolet radiation transmittance when compared to typical green glasses used in automotive applications. The glass is also compatible with float glass manufacturing methods.

Various dark tinted, infrared and ultraviolet radiation absorbing glass compositions are known in the art. The primary colorant in typical dark tinted automotive privacy glasses is iron, which is usually present in both the $Fe_2O_3$ and FeO forms. Some glasses use cobalt, selenium and, optionally, nickel in combination with iron to further control infrared and ultraviolet radiation and color, for example as disclosed in U.S. Pat. No. 4,873,206 to Jones; U.S. Pat. No. 5,278,108 to Cheng et al.; U.S. Pat. No. 5,308,805 to Baker et al.; and U.S. Pat. No. 5,393,593 to Gulotta et al., and European Patent application EP 0 705 800. Others also include chromium with this combination of colorants as disclosed in U.S. Pat. No. 4,104,076 to Pons; U.S. Pat. No. 4,339,541 to Dela Ruye; U.S. Pat. No. 5,023,210 to Krumwiede et al; and U.S. Pat. No. 5,352,640 to Combes et al.; European Patent application EP 0 536 049; French Patent 2,331,527 and Canadian Patent 2,148,954. Still, other glasses may include additional materials, such as disclosed in WO 96/00194, which teaches the inclusion of fluorine, zirconium, zinc, cerium, titanium and copper in the glass composition and requires that the sum of the alkaline earth oxides be less than 10 wt. % of the glass.

In producing infrared and ultraviolet radiation absorbing glasses, the relative amounts of iron and other additives must be closely monitored and controlled within an operating range to provide the desired color and spectral properties. It would be desirable to have a dark tinted green colored glass that may be used as a privacy glazing for vehicles to complement the green colored glasses typically used in automobiles that exhibits superior solar performance properties and is compatible with commercial float glass manufacturing techniques.

SUMMARY OF THE INVENTION

The present invention provides a green colored, infrared and ultraviolet absorbing glass article having a luminous transmittance of up to 60 percent. The composition of the glass article uses a standard soda-lime-silica glass base composition and additionally iron, cobalt, selenium, and chromium, and optionally titanium, as infrared and ultraviolet radiation absorbing materials and colorants. The glasses of the present invention have a color characterized by a dominant wavelength in the range of about 480 to 565 nanometers, preferably about 495 to 560 nanometers, with an excitation purity of no higher than about 20%, preferably no higher than about 10%, and more preferably no higher than about 7%. The glass compositions may be provided with different levels of spectral performance depending on the particular application and desired luminous transmittance.

In one embodiment of the invention, the glass composition of a green colored, infrared and ultraviolet radiation absorbing soda-lime-silica glass article includes a solar radiation absorbing and colorant portion having about 0.60 to 4 percent by weight total iron, about 0.13 to 0.9 percent by weight FeO, about 40 to 500 PPM CoO, about 5 to 70 PPM Se, about 15 to 800 PPM $Cr_2O_3$, and about 0.02 to 1 percent by weight $TiO_2$. In another embodiment of the invention, the glass composition of the article includes a solar radiation absorbing and colorant portion having 1 to less than 1.4 percent by weight total iron, about 0.2 to 0.6 percent by weight FeO, greater than 200 to about 500 PPM CoO, about 5 to 70 PPM Se, greater than 200 to about 800 PPM $Cr_2O_3$, and 0 to about 1 percent by weight $TiO_2$.

DETAILED DESCRIPTION OF THE INVENTION

The base glass of the present invention, that is, the primary constituents of the glass without infrared or ultraviolet absorbing materials and/or colorants, which are the object of the present invention, is commercial soda-lime-silica glass characterized as follows:

| | Weight Percent |
|---|---|
| $SiO_2$ | 66–75 |
| $Na_2O$ | 10–20 |
| CaO | 5–15 |
| MgO | 0–5 |
| $Al_2O_3$ | 0–5 |
| $K_2O$ | 0–5 |

As used herein, all "weight percent (wt. %)" values are based on the total weight of the final glass composition.

To this base glass, the present invention adds infrared and ultraviolet radiation absorbing materials and colorants in the form of iron, cobalt, selenium, chromium and, optionally, titanium. As disclosed herein, iron is expressed in terms of $Fe_2O_3$ and FeO, cobalt is expressed in terms of CoO, selenium is expressed in terms of elemental Se, chromium is expressed in terms of $Cr_2O_3$ and titanium is expressed in terms of $TiO_2$. These materials and colorants preferably constitute the major colorants derived from additions to the batch materials for melting to make up the major portion of the infrared and ultraviolet radiation absorbing materials and colorants through out the glass composition rather than just on or near one or more surfaces of the form or structure of the glass composition. Although it should be appreciated that the glass compositions disclosed herein may include small amounts of other materials or materials formed in-situ during melting that may affect the color of the glass composition. An example of these includes some melting and refining aids, tramp materials or impurities. It should be further appreciated that in one embodiment of the invention, small amounts of additional materials may be included in the glass to improve the solar performance of the glass as will be discussed later in more detail. Most preferably the glass composition is essentially free of other major colorants. The glass composition of the present invention is preferably essentially free of materials added to the batch to result in the glass composition having fluorine, and oxides of zirconium, cesium, boron, and barium. In one embodiment the transition metals and oxides for the major colorants consist essentially of iron, cobalt, selenium, chromium and, optionally, titanium.

The iron oxides in a glass composition perform several functions. Ferric oxide, $Fe_2O_3$, is a strong ultraviolet radiation absorber and operates as a yellow colorant in the glass. Ferrous oxide, FeO, is a strong infrared radiation absorber and operates as a blue colorant. The total amount of iron present in the glasses disclosed herein is expressed in terms of $Fe_2O_3$ in accordance with standard analytical practice but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$ and the term "FeO" shall mean iron in the ferrous state expressed in terms of FeO.

Se is an ultraviolet and infrared radiation absorbing colorant that imparts a pink or brown color to soda-lime-silica glass. Se may also absorb some infrared radiation and its use tends to decrease redox. CoO operates as a blue colorant and does not exhibit any appreciable ultraviolet or infrared radiation absorbing properties. $Cr_2O_3$ imparts a green color to the glass and helps control the final glass color. It is believed that the chromium may also provide some ultraviolet radiation absorption. $TiO_2$ is an ultraviolet radiation absorber that operates as a colorant imparting a yellow color to the glass composition. A proper balance between the iron, i.e. ferric and ferrous oxides, chromium, selenium, cobalt and optionally titanium content is required to obtain the desired green colored privacy glass with the desired spectral properties.

The glass of the present invention may be melted and refined in a continuous, large-scale, commercial melting operation and formed into flat glass sheets of varying thicknesses by the float method in which the molten glass is supported on a pool of molten metal, usually tin, as it assumes a ribbon shape and is cooled. It should be appreciated that as a result of forming the glass on molten tin, measurable amounts of tin oxide may migrate into surface portions of the glass on the side that was in contact with the tin. Typically, a piece of float glass has an $SnO_2$ concentration of at least 0.05 to 2 wt. % in the first 25 microns below the surface of the glass that was in contact with the tin. Typical background levels of $SnO_2$ may be as high as 30 parts per million (PPM). It is believed without limiting the invention that high tin concentrations in about the first 10 angstroms of the glass surface supported by the molten tin may slightly increase the reflectivity of that glass surface; however, the overall impact on the glass properties is minimal.

The melting and forming arrangements used to produce the glass compositions of the present invention include, but are not limited to a conventional, overhead fired continuous melting operation, as is well known in the art, or a multi-stage melting operation, as disclosed in U.S. Pat. No. 4,381,934 to Kunkle et al.; U.S. Pat. No. 4,792,536 to Pecoraro et al. and U.S. Pat. No. 4,886,539 to Cerutti et al. If required, a stirring arrangement may be employed within the melting and/or forming stages of the glass production operation to homogenize the glass in order to produce glass of the highest optical quality.

Tables 1, 2 and 3 illustrate examples of glass compositions which embody the principles of the present invention. The examples in Tables 1 and 2 are computer modeled compositions generated by a glass color and spectral performance computer model developed by PPG Industries, Inc. The examples in Table 3 are actual experimental laboratory melts. The spectral properties shown for Tables 1 and 3 are based on a reference thickness of 0.160 inches (4.06 mm) and those in Table 2 are based on a reference thickness of 0.154 inches (3.91 mm). For comparison purposes, the spectral properties of the examples may be approximated at different thicknesses using the formulas disclosed in U.S. Pat. No. 4,792,536. Only the iron, cobalt, selenium, chromium and titanium portions of the examples are listed in the tables. With respect to the transmittance data provided in the tables, the luminous transmittance (LTA) is measured using C.I.E. standard illuminant "A" with a 2° observer over the wavelength range 380 to 770 nanometers and glass color, in terms of dominant wavelength and excitation purity, is measured using C.I.E. standard illuminant "C" with a 2° observer, following the procedures established in ASTM E308-90. The total solar ultraviolet transmittance (TSUV) is measured over the wavelength range 300 to 400 nanometers, total solar infrared transmittance (TSIR) is measured over the wavelength range 720 to 2000 nanometers, and total solar energy transmittance (TSET) is measured over the wavelength range 300 to 2000 nanometers. The TSUV, TSIR and TSET transmittance data are calculated using Parry Moon air mass 2.0 direct solar irradiance data and integrated using the Trapezoidal Rule, as is known in the art.

The optical properties reported in Tables 1 and 2 are the expected properties of a glass having a base glass composition and colorants, generally as discussed herein, based upon the absorption coefficients of the glass' constituents, assuming that the glass is homogeneous throughout and is manufactured by a conventional float glass process, as is well known in the art.

The information provided in Table 3 is based on experimental laboratory melts having approximately the following batch components:

| | |
|---|---:|
| cullet A | 125 gm |
| cullet B | 22.32 gm |
| cullet C | 8.93 gm |
| rouge | 0.32 gm |
| $Cr_2O_3$ | 0.0461 gm |
| $TiO_2$ | 0.3–0.6 gm |
| Se | 0.0037–0.0073 gm |
| graphite | 0.015 gm |

The cullets used in the melts included varying amounts of iron, cobalt, selenium, chromium and/or titanium. More specifically, cullet A included 0.811 wt. % total iron, 0.212 wt. % FeO, 101 PPM CoO, 17 PPM Se, 8 PPM $Cr_2O_3$, and 0.02 wt. % $TiO_2$. Cullet B included 1.417 wt. % total iron, 0.362 wt. % FeO, 211.25 PPM CoO, 25 PPM Se, and 7.5 PPM $Cr_2O_3$. Cullet C included 0.93 wt. % total iron, 0.24 wt. % FeO, 6 PPM $Cr_2O_3$, and 0.02 wt. % $TiO_2$. In preparing the melts, the ingredients were weighed out and mixed. It is believed that the material was then placed in a 4-inch platinum crucible and heated to 2600° F. (1427° C.) for 30 minutes and then heated to 2650° F. (1454° C.) for 1 hour. Next, the molten glass was fritted in water, dried, put in a 2-inch platinum crucible and reheated at 2650° F. (1454° C.) for at least 1 hour. The molten glass was then poured out of the crucible to form a slab and annealed. Samples were cut from the slab and ground and polished for analysis. The chemical analysis of the glass compositions was determined using a RIGAKU 3370 X-ray fluorescence spectrophotometer. The FeO content was determined using wet chemistry techniques, as is well known in the art. The spectral characteristics of the glass were determined on annealed samples using a Perkin-Elmer Lambda 9 UV/VIS/NIR spectrophotometer prior to tempering the glass or prolonged exposure to ultraviolet radiation, which will effect the spectral properties of the glass.

The following is representative of the basic oxides of the particular experimental melts disclosed in Table 3, which also fall within the base glass composition discussed earlier:

| | |
|---|---|
| $SiO_2$ | 70–72 wt. % |
| $Na_2O$ | 12–14 wt. % |
| CaO | 8–10 wt. % |
| MgO | 3–4 wt. % |
| $Al_2O_3$ | 0.1–0.6 wt. % |
| $K_2O$ | 0.01–0.15 wt. % |

The analysis of these melts also showed that the glasses included about 0.081 wt. % $MnO_2$. It is presumed that the $MnO_2$ entered into the glass melt as part of the cullet.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| FeO (wt. %) | 0.4320 | 0.5580 | 0.7240 | 0.4775 | 0.5225 | 0.5143 | 0.5670 | 0.6545 | 0.6110 | 0.4725 | 0.6938 |
| Total iron (wt. %) | 1.920 | 1.860 | 1.810 | 1.910 | 1.900 | 1.870 | 1.890 | 1.870 | 1.880 | 1.890 | 1.850 |
| Model redox | 0.2250 | 0.3000 | 0.4000 | 0.2500 | 0.2750 | 0.2750 | 0.3000 | 0.3500 | 0.3250 | 0.2500 | 0.3750 |
| Cr2O3 (wt. %) | 0.0365 | 0.0350 | 0.0350 | 0.0365 | 0.0365 | 0.0340 | 0.0365 | 0.0370 | 0.0365 | 0.0350 | 0.0370 |
| CoO (wt. %) | 0.0391 | 0.0356 | 0.0310 | 0.0377 | 0.0364 | 0.0370 | 0.0351 | 0.0326 | 0.0338 | 0.0379 | 0.0314 |
| Se (wt. %) | 0.0047 | 0.0050 | 0.0054 | 0.0048 | 0.0049 | 0.0048 | 0.0050 | 0.0052 | 0.0051 | 0.0047 | 0.0053 |
| TiO2 (wt. %) | | 0.1800 | 0.2400 | | | 0.4900 | | | | 0.3400 | |
| LTA (%) | 5.02 | 5.04 | 5.05 | 5.05 | 5.06 | 5.08 | 5.08 | 5.10 | 5.10 | 5.12 | 5.12 |
| TSUV (%) | 2.48 | 2.88 | 3.58 | 2.62 | 2.77 | 2.59 | 2.94 | 3.29 | 3.11 | 2.52 | 3.51 |
| TSIR (%) | 7.28 | 3.84 | 1.73 | 5.76 | 4.59 | 4.78 | 3.68 | 2.41 | 2.97 | 5.91 | 2.00 |
| TSET (%) | 6.33 | 4.42 | 3.18 | 5.50 | 4.85 | 4.96 | 4.33 | 3.60 | 3.93 | 5.61 | 3.37 |
| DW (nm) | 551.02 | 550.90 | 550.96 | 551.29 | 550.79 | 550.61 | 550.68 | 550.52 | 550.92 | 550.76 | 550.81 |
| Pe (%) | 3.58 | 3.57 | 3.62 | 3.72 | 3.72 | 3.85 | 3.76 | 3.85 | 3.84 | 3.86 | 3.83 |

| | Ex. 12 | Ex. 13 | Ex. 14 | Ex. 15 | Ex. 16 | Ex. 17 | Ex. 18 | Ex. 19 | Ex. 20 | Ex. 21 | Ex. 22 |
|---|---|---|---|---|---|---|---|---|---|---|---|
| FeO (wt. %) | 0.5980 | 0.7360 | 0.4298 | 0.6825 | 0.6405 | 0.3860 | 0.3860 | 0.3750 | 0.3750 | 0.8750 | 0.3750 |
| Total iron (wt. %) | 1.840 | 1.840 | 1.910 | 1.820 | 1.830 | 1.930 | 1.930 | 1.500 | 1.500 | 3.500 | 1.500 |
| Model redox | 0.3250 | 0.4000 | 0.2250 | 0.3750 | 0.3500 | 0.2000 | 0.2000 | 0.2500 | 0.2500 | 0.2500 | 0.2500 |
| Cr2O3 (wt. %) | 0.0355 | 0.0370 | 0.0340 | 0.0340 | 0.0345 | 0.0375 | 0.0330 | 0.0250 | 0.0250 | 0.0250 | 0.0250 |
| CoO (wt. %) | 0.0344 | 0.0302 | 0.0390 | 0.0320 | 0.0330 | 0.0398 | 0.0400 | 0.0450 | 0.0400 | 0.0220 | 0.0220 |
| Se (wt. %) | 0.0050 | 0.0054 | 0.0046 | 0.0052 | 0.0051 | 0.0045 | 0.0044 | 0.0027 | 0.0027 | 0.0027 | 0.0060 |
| TiO2 (wt. %) | 0.4400 | | 0.2600 | 0.4500 | 0.3900 | | 0.3900 | 0.2000 | 0.2000 | 0.2000 | 0.2000 |
| LTA (%) | 5.13 | 5.13 | 5.15 | 5.16 | 5.19 | 5.20 | 5.28 | 6.54 | 7.80 | 8.59 | 8.73 |
| TSUV (%) | 2.95 | 3.72 | 2.41 | 3.29 | 3.16 | 2.40 | 2.24 | 6.17 | 6.21 | 1.07 | 2.86 |
| TSIR (%) | 3.16 | 1.64 | 7.38 | 2.11 | 2.58 | 9.28 | 9.29 | 9.94 | 9.99 | 0.89 | 9.98 |
| TSET (%) | 4.05 | 3.16 | 6.44 | 3.44 | 3.73 | 7.54 | 7.54 | 9.18 | 9.65 | 3.64 | 9.09 |
| DW (nm) | 550.64 | 551.01 | 550.93 | 550.70 | 550.93 | 550.63 | 550.86 | 478.05 | 479.92 | 549.82 | 581.29 |
| Pe (%) | 3.98 | 3.86 | 3.70 | 3.89 | 3.92 | 3.76 | 3.89 | 30.19 | 23.61 | 18.23 | 38.27 |

| | Ex. 23 | Ex. 24 | Ex. 25 | Ex. 26 | Ex. 27 | Ex. 28 | Ex. 29 | Ex. 30 | Ex. 31 | Ex. 32 | Ex. 33 |
|---|---|---|---|---|---|---|---|---|---|---|---|
| FeO (wt. %) | 0.8125 | 0.3750 | 0.375 | 0.75 | 0.225 | 0.6875 | 0.375 | 0.175 | 0.375 | 0.625 | 0.5625 |
| Total iron (wt. %) | 3.250 | 1.500 | 1.5000 | 3.0000 | 0.9000 | 2.7500 | 1.5000 | 0.7000 | 1.5000 | 2.5000 | 2.2500 |
| Model redox | 0.2500 | 0.2500 | 0.250 | 0.250 | 0.250 | 0.250 | 0.250 | 0.250 | 0.250 | 0.250 | 0.250 |
| Cr2O3 (wt. %) | 0.0250 | 0.0250 | 0.0250 | 0.0250 | 0.0250 | 0.0250 | 0.0250 | 0.0210 | 0.0250 | 0.0250 | 0.0250 |
| CoO (wt. %) | 0.0220 | 0.0350 | 0.0220 | 0.0220 | 0.0450 | 0.0220 | 0.0220 | 0.0450 | 0.0300 | 0.0220 | 0.0220 |
| Se (wt. %) | 0.0027 | 0.0027 | 0.0053 | 0.0027 | 0.0017 | 0.0027 | 0.0046 | 0.0011 | 0.0027 | 0.0027 | 0.0027 |
| TiO2 (wt. %) | 0.2000 | 0.2000 | 0.2000 | 0.2000 | 0.2000 | 0.2000 | 0.2000 | 0.2000 | 0.2000 | 0.2000 | 0.2000 |
| LTA (%) | 9.20 | 9.33 | 9.74 | 9.86 | 10.49 | 10.56 | 10.90 | 10.99 | 11.19 | 11.33 | 12.15 |
| TSUV (%) | 1.32 | 6.24 | 3.39 | 1.62 | 18.98 | 2.00 | 4.01 | 26.80 | 6.28 | 2.49 | 3.11 |
| TSIR (%) | 1.18 | 10.04 | 10.02 | 1.58 | 23.31 | 2.11 | 10.06 | 30.70 | 10.09 | 2.85 | 3.88 |
| TSET (%) | 4.10 | 10.20 | 9.54 | 4.64 | 19.61 | 5.29 | 10.08 | 24.75 | 10.84 | 6.09 | 7.09 |
| DW (nm) | 549.90 | 482.49 | 579.72 | 549.97 | 474.57 | 550.01 | 577.57 | 473.07 | 487.02 | 550.02 | 549.99 |
| Pe (%) | 16.69 | 16.75 | 31.58 | 15.12 | 43.48 | 13.51 | 24.63 | 50.78 | 9.78 | 11.87 | 10.21 |

| | Ex. 34 | Ex. 35 | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|---|---|
| FeO (wt. %) | 0.375 | 0.225 | 0.5 | 0.6 | 0.175 | 0.375 | 0.5625 | 0.375 | 0.375 | 0.525 | 0.375 |
| Total iron (wt. %) | 1.5000 | 0.9000 | 2.0000 | 1.500 | 0.700 | 1.500 | 1.500 | 1.500 | 1.500 | 1.500 | 1.500 |
| Model redox | 0.250 | 0.250 | 0.250 | 0.4000 | 0.2500 | 0.2500 | 0.3750 | 0.2500 | 0.2500 | 0.3500 | 0.2500 |
| Cr2O3 (wt. %) | 0.0250 | 0.0250 | 0.0250 | 0.0250 | 0.0210 | 0.0800 | 0.0250 | 0.0250 | 0.0700 | 0.0250 | 0.0250 |
| CoO (wt. %) | 0.0220 | 0.0400 | 0.0220 | 0.0220 | 0.0400 | 0.0220 | 0.0220 | 0.0250 | 0.0220 | 0.0220 | 0.0220 |

TABLE 1-continued

|  | | | | | | | | | | |
|---|---|---|---|---|---|---|---|---|---|---|
| Se (wt. %) | 0.0039 | 0.0017 | 0.0027 | 0.0027 | 0.0011 | 0.0027 | 0.0027 | 0.0027 | 0.0027 | 0.0027 | 0.0032 |
| TiO2 (wt. %) | 0.2000 | 0.2000 | 0.2000 | 0.2000 | 0.2000 | 0.2000 | 0.2000 | 0.2000 | 0.2000 | 0.2000 | 0.2000 |
| LTA (%) | 12.23 | 12.42 | 13.04 | 13.10 | 13.12 | 13.23 | 13.40 | 13.45 | 13.53 | 13.70 | 13.78 |
| TSUV (%) | 4.74 | 19.09 | 3.91 | 9.03 | 26.97 | 6.09 | 8.50 | 6.31 | 6.13 | 8.00 | 5.62 |
| TSIR (%) | 10.10 | 23.41 | 5.30 | 3.24 | 30.90 | 10.05 | 3.89 | 10.14 | 10.07 | 4.69 | 10.14 |
| TSET (%) | 10.72 | 20.37 | 8.36 | 7.78 | 25.64 | 10.89 | 8.22 | 11.61 | 11.10 | 8.74 | 11.50 |
| DW (nm) | 574.14 | 475.74 | 549.87 | 488.02 | 474.18 | 554.18 | 489.76 | 502.78 | 553.79 | 492.18 | 566.66 |
| Pe (%) | 17.48 | 37.70 | 8.51 | 11.44 | 45.13 | 12.49 | 9.38 | 3.22 | 11.14 | 7.32 | 10.21 |

|  | Ex. 45 | Ex. 46 | Ex. 47 | Ex. 48 | Ex. 49 | Ex. 50 | Ex. 51 | Ex. 52 | Ex. 53 | Ex. 54 | Ex. 55 |
|---|---|---|---|---|---|---|---|---|---|---|---|
| FeO (wt. %) | 0.375 | 0.4375 | 0.4875 | 0.375 | 0.4500 | 0.3750 | 0.4125 | 0.2250 | 0.3750 | 0.3750 | 0.3750 |
| Total iron (wt. %) | 1.500 | 1.750 | 1.500 | 1.500 | 1.500 | 1.500 | 1.500 | 0.900 | 1.500 | 1.500 | 1.500 |
| Model redox | 0.2500 | 0.2500 | 0.3250 | 0.2500 | 0.3000 | 0.2500 | 0.2750 | 0.2500 | 0.2500 | 0.2500 | 0.2500 |
| Cr2O3 (wt. %) | 0.0600 | 0.0250 | 0.0250 | 0.0500 | 0.0250 | 0.0400 | 0.0250 | 0.0250 | 0.0300 | 0.0250 | 0.0250 |
| CoO (wt. %) | 0.0220 | 0.0220 | 0.0220 | 0.0220 | 0.0220 | 0.0220 | 0.0220 | 0.0350 | 0.0220 | 0.0220 | 0.0220 |
| Se (wt. %) | 0.0027 | 0.0027 | 0.0027 | 0.0027 | 0.0027 | 0.0027 | 0.0027 | 0.0017 | 0.0027 | 0.0027 | 0.0027 |
| TiO2 (wt. %) | 0.2000 | 0.2000 | 0.2000 | 0.2000 | 0.2000 | 0.2000 | 0.2000 | 0.2000 | 0.2000 | 0.8000 | 0.7000 |
| LTA (%) | 13.85 | 14.00 | 14.02 | 14.17 | 14.34 | 14.51 | 14.68 | 14.74 | 14.86 | 14.90 | 14.93 |
| TSUV (%) | 6.18 | 4.96 | 7.54 | 6.22 | 7.11 | 6.27 | 6.71 | 19.20 | 6.31 | 5.44 | 5.58 |
| TSIR (%) | 10.09 | 7.31 | 5.66 | 10.11 | 6.86 | 10.14 | 8.34 | 23.52 | 10.16 | 10.17 | 10.17 |
| TSET (%) | 11.31 | 10.00 | 9.37 | 11.54 | 10.12 | 11.77 | 11.04 | 21.26 | 12.02 | 11.97 | 12.00 |
| DW (nm) | 553.27 | 549.62 | 496.03 | 552.58 | 503.82 | 551.62 | 525.32 | 477.06 | 550.13 | 558.49 | 557.46 |
| Pe (%) | 9.78 | 6.79 | 5.31 | 8.43 | 3.46 | 7.08 | 2.97 | 31.54 | 5.72 | 8.18 | 7.66 |

|  | Ex. 56 | Ex. 57 | Ex. 58 | Ex. 59 | Ex. 60 | Ex. 61 | Ex. 62 | Ex. 63 | Ex. 64 | Ex. 65 | Ex. 66 |
|---|---|---|---|---|---|---|---|---|---|---|---|
| FeO (wt. %) | 0.3750 | 0.3750 | 0.3750 | 0.2948 | 0.3750 | 0.3750 | 0.3750 | 0.3750 | 0.3493 | 0.3810 | 0.3250 |
| Total iron (wt. %) | 1.500 | 1.500 | 1.500 | 1.310 | 1.500 | 1.500 | 1.500 | 1.500 | 1.270 | 1.270 | 1.300 |
| Model redox | 0.2500 | 0.2500 | 0.2500 | 0.2250 | 0.2500 | 0.2500 | 0.2500 | 0.2500 | 0.2750 | 0.3000 | 0.2500 |
| Cr2O3 (wt. %) | 0.0250 | 0.0250 | 0.0250 | 0.0280 | 0.0250 | 0.0250 | 0.0250 | 0.0250 | 0.0255 | 0.0260 | 0.0280 |
| CoO (wt. %) | 0.0220 | 0.0220 | 0.0220 | 0.0235 | 0.0220 | 0.0220 | 0.0220 | 0.0220 | 0.0222 | 0.0212 | 0.0226 |
| Se (wt. %) | 0.0027 | 0.0027 | 0.0027 | 0.0028 | 0.0027 | 0.0027 | 0.0027 | 0.0027 | 0.0029 | 0.0030 | 0.0029 |
| TiO2 (wt. %) | 0.6000 | 0.5000 | 0.4000 | 0.3000 | 0.2000 | 0.2000 | 0.2000 | 0.2000 | 0.3000 | 0.1500 | 0.1500 |
| LTA (%) | 14.95 | 14.97 | 14.99 | 15.01 | 15.01 | 15.04 | 15.04 | 15.04 | 15.04 | 15.05 | 15.05 |
| TSUV (%) | 5.72 | 5.87 | 6.02 | 7.47 | 6.18 | 6.34 | 6.34 | 6.34 | 7.81 | 8.35 | 7.82 |
| TSIR (%) | 10.17 | 10.17 | 10.17 | 15.69 | 10.17 | 10.17 | 10.17 | 10.17 | 11.67 | 9.85 | 13.30 |
| TSET (%) | 12.03 | 12.05 | 12.08 | 15.28 | 12.11 | 12.14 | 12.14 | 12.14 | 13.09 | 12.09 | 13.99 |
| DW (nm) | 556.28 | 554.91 | 553.31 | 550.91 | 551.42 | 549.10 | 549.10 | 549.10 | 550.99 | 550.72 | 550.89 |
| Pe (%) | 7.14 | 6.61 | 6.09 | 3.66 | 5.57 | 5.04 | 5.04 | 5.04 | 3.66 | 3.57 | 3.69 |

|  | Ex. 67 | Ex. 68 | Ex. 69 | Ex. 70 | Ex. 71 | Ex. 72 | Ex. 73 | Ex. 74 | Ex. 75 | Ex. 76 | Ex. 77 |
|---|---|---|---|---|---|---|---|---|---|---|---|
| FeO (wt. %) | 0.4960 | 0.4650 | 0.3750 | 0.2600 | 0.3750 | 0.2880 | 0.4410 | 0.4375 | 0.3200 | 0.3548 | 0.4688 |
| Total iron (wt. %) | 1.240 | 1.240 | 1.500 | 1.300 | 1.500 | 1.280 | 1.260 | 1.250 | 1.280 | 1.290 | 1.250 |
| Model redox | 0.4000 | 0.3750 | 0.2500 | 0.2000 | 0.2500 | 0.2250 | 0.3500 | 0.3500 | 0.2500 | 0.2750 | 0.3750 |
| Cr2O3 (wt. %) | 0.0290 | 0.0260 | 0.0250 | 0.0270 | 0.0250 | 0.0260 | 0.0290 | 0.0260 | 0.0260 | 0.0290 | 0.0290 |
| CoO (wt. %) | 0.0178 | 0.0189 | 0.0220 | 0.0245 | 0.0220 | 0.0240 | 0.0193 | 0.0197 | 0.0230 | 0.0217 | 0.0185 |
| Se (wt. %) | 0.0033 | 0.0032 | 0.0027 | 0.0027 | 0.0027 | 0.0027 | 0.0032 | 0.0031 | 0.0028 | 0.0029 | 0.0032 |
| TiO2 (wt. %) |  | 0.2000 | 0.1000 | 0.1300 | 0.0200 | 0.4800 |  | 0.3000 | 0.3500 |  |  |
| LTA (%) | 15.05 | 15.06 | 15.06 | 15.07 | 15.08 | 15.08 | 15.09 | 15.09 | 15.09 | 15.09 | 15.11 |
| TSUV (%) | 10.25 | 9.45 | 6.50 | 7.10 | 6.63 | 6.98 | 9.38 | 8.87 | 7.42 | 8.20 | 9.82 |
| TSIR (%) | 5.43 | 6.36 | 10.17 | 19.02 | 10.17 | 16.29 | 7.19 | 7.33 | 13.67 | 11.32 | 6.24 |
| TSET (%) | 9.57 | 10.11 | 12.17 | 17.12 | 12.20 | 15.62 | 10.59 | 10.66 | 14.20 | 12.91 | 10.05 |
| DW (nm) | 551.07 | 550.60 | 546.28 | 550.76 | 543.54 | 550.58 | 550.53 | 550.77 | 550.65 | 550.53 | 550.80 |
| Pe (%) | 3.79 | 3.60 | 4.53 | 3.54 | 4.12 | 3.82 | 3.77 | 3.79 | 3.76 | 3.79 | 3.80 |

|  | Ex. 78 | Ex. 79 | Ex. 80 | Ex. 81 | Ex. 82 | Ex. 83 | Ex. 84 | Ex. 85 | Ex. 86 | Ex. 87 | Ex. 88 |
|---|---|---|---|---|---|---|---|---|---|---|---|
| FeO (wt. %) | 0.4095 | 0.4960 | 0.3840 | 0.2640 | 0.4128 | 0.3750 | 0.3375 | 0.3750 | 0.3750 | 0.1750 | 0.3000 |
| Total iron (wt. %) | 1.260 | 1.240 | 1.280 | 1.320 | 1.270 | 1.500 | 1.500 | 1.500 | 1.500 | 0.700 | 1.500 |
| Model redox | 0.3250 | 0.4000 | 0.3000 | 0.2000 | 0.3250 | 0.2500 | 0.2250 | 0.2500 | 0.2500 | 0.2500 | 0.2000 |
| Cr2O3 (wt. %) | 0.0260 | 0.0250 | 0.0290 | 0.0280 | 0.0290 | 0.0200 | 0.0250 | 0.0250 | 0.0100 | 0.0210 | 0.0250 |
| CoO (wt. %) | 0.0205 | 0.0182 | 0.0208 | 0.0242 | 0.0200 | 0.0220 | 0.0220 | 0.0220 | 0.0220 | 0.0350 | 0.0220 |
| Se (wt. %) | 0.0030 | 0.0032 | 0.0030 | 0.0027 | 0.0031 | 0.0027 | 0.0027 | 0.0025 | 0.0027 | 0.0011 | 0.0027 |
| TiO2 (wt. %) | 0.3900 | 0.4400 |  |  |  | 0.2000 | 0.2000 | 0.2000 | 0.2000 | 0.2000 | 0.2000 |
| LTA (%) | 15.14 | 15.14 | 15.15 | 15.16 | 15.16 | 15.22 | 15.40 | 15.58 | 15.59 | 15.72 | 15.78 |
| TSUV (%) | 8.34 | 9.35 | 8.59 | 7.18 | 8.99 | 6.36 | 5.98 | 6.65 | 6.40 | 27.14 | 5.65 |
| TSIR (%) | 8.48 | 5.44 | 9.69 | 18.60 | 8.33 | 10.18 | 12.44 | 10.18 | 10.21 | 31.05 | 15.27 |
| TSET (%) | 11.32 | 9.58 | 12.02 | 16.92 | 11.26 | 12.27 | 13.49 | 12.43 | 12.54 | 26.69 | 15.14 |
| DW (nm) | 550.87 | 550.70 | 551.11 | 550.86 | 550.82 | 547.74 | 559.28 | 528.36 | 543.24 | 475.35 | 564.59 |
| Pe (%) | 3.95 | 3.93 | 3.89 | 3.70 | 3.85 | 4.37 | 7.45 | 3.26 | 3.03 | 39.04 | 9.88 |

TABLE 1-continued

|  | Ex. 89 | Ex. 90 | Ex. 91 | Ex. 92 | Ex. 93 | Ex. 94 | Ex. 95 | Ex. 96 | Ex. 97 | Ex. 98 | Ex. 99 |
|---|---|---|---|---|---|---|---|---|---|---|---|
| FeO (wt. %) | 0.3750 | 0.3750 | 0.3750 | 0.2250 | 0.3120 | 0.2990 | 0.2860 | 0.2990 | 0.3750 | 0.1750 | 0.2250 |
| Total iron (wt. %) | 1.500 | 1.500 | 1.500 | 0.900 | 1.200 | 1.150 | 1.100 | 1.100 | 1.500 | 0.700 | 0.900 |
| Model redox | 0.2500 | 0.2500 | 0.2500 | 0.2500 | 0.2600 | 0.2600 | 0.2600 | 0.2720 | 0.2500 | 0.2500 | 0.2500 |
| Cr2O3 (wt. %) | 0.0005 | 0.0250 | 0.0250 | 0.0250 | 0.0230 | 0.0280 | 0.0320 | 0.0320 | 0.0250 | 0.0210 | 0.0250 |
| CoO (wt. %) | 0.0220 | 0.0200 | 0.0220 | 0.0300 | 0.0196 | 0.0200 | 0.0201 | 0.0198 | 0.0220 | 0.0300 | 0.0107 |
| Se (wt. %) | 0.0027 | 0.0027 | 0.0020 | 0.0017 | 0.0025 | 0.0024 | 0.0025 | 0.0025 | 0.0015 | 0.0011 | 0.0060 |
| TiO2 (wt. %) | 0.2000 | 0.2000 | 0.2000 | 0.2000 | 0.0280 | 0.0280 | 0.0280 | 0.0280 | 0.2000 | 0.2000 | 0.2000 |
| LTA (%) | 15.95 | 16.20 | 17.04 | 17.54 | 18.03 | 18.05 | 18.02 | 18.06 | 18.68 | 18.88 | 19.28 |
| TSUV (%) | 6.45 | 6.35 | 7.50 | 19.31 | 9.55 | 10.19 | 10.64 | 10.87 | 8.46 | 27.31 | 7.87 |
| TSIR (%) | 10.23 | 10.19 | 10.22 | 23.63 | 11.9 | 12.88 | 13.95 | 12.88 | 10.25 | 31.19 | 23.35 |
| TSET (%) | 12.80 | 12.53 | 13.22 | 22.30 | 15.38 | 15.96 | 16.53 | 15.95 | 14.13 | 27.91 | 20.49 |
| DW (nm) | 533.25 | 560.22 | 496.92 | 478.60 | 556.5 | 547.3 | 549.7 | 545.6 | 491.19 | 476.64 | 583.88 |
| Pe (%) | 1.81 | 8.39 | 5.84 | 25.04 | 4.43 | 3.36 | 3.62 | 3.27 | 10.53 | 32.49 | 41.80 |

|  | Ex. 100 | Ex. 101 | Ex. 102 | Ex. 103 | Ex. 104 | Ex. 106 | Ex. 106 | Ex. 107 | Ex. 108 | Ex. 109 | Ex. 110 |
|---|---|---|---|---|---|---|---|---|---|---|---|
| FeO (wt. %) | 0.3750 | 0.2250 | 0.2250 | 0.3750 | 0.1750 | 0.1750 | 0.2250 | 0.3750 | 0.1750 | 0.2250 | 0.2060 |
| Total iron (wt. %) | 1.500 | 0.900 | 0.900 | 1.500 | 0.700 | 0.700 | 0.900 | 1.500 | 0.700 | 0.900 | 1.030 |
| Model redox | 0.2500 | 0.2500 | 0.2500 | 0.2500 | 0.2500 | 0.2500 | 0.2500 | 0.2500 | 0.2500 | 0.2500 | 0.2000 |
| Cr2O3 (wt. %) | 0.0250 | 0.0250 | 0.0250 | 0.0250 | 0.0210 | 0.0210 | 0.0250 | 0.0250 | 0.0210 | 0.0250 | 0.0240 |
| CoO (wt. %) | 0.0150 | 0.0250 | 0.0107 | 0.0220 | 0.0070 | 0.0250 | 0.0107 | 0.0100 | 0.0070 | 0.0200 | 0.0170 |
| Se (wt. %) | 0.0027 | 0.0017 | 0.0053 | 0.0008 | 0.0060 | 0.0011 | 0.0046 | 0.0027 | 0.0053 | 0.0017 | 0.0018 |
| TiO2 (wt. %) | 0.2000 | 0.2000 | 0.2000 | 0.2000 | 0.2000 | 0.2000 | 0.2000 | 0.2000 | 0.2000 | 0.2000 |  |
| LTA (%) | 19.57 | 20.92 | 21.12 | 21.31 | 21.65 | 22.73 | 23.19 | 23.68 | 23.86 | 25.01 | 25.01 |
| TSUV (%) | 6.39 | 19.42 | 9.14 | 10.02 | 9.26 | 27.48 | 10.62 | 6.42 | 10.85 | 19.53 | 12.29 |
| TSIR (%) | 10.25 | 23.73 | 23.46 | 10.29 | 31.12 | 31.34 | 23.57 | 10.30 | 31.22 | 23.84 | 26.16 |
| TSET (%) | 13.63 | 23.52 | 21.34 | 15.65 | 25.68 | 29.35 | 22.31 | 14.95 | 26.65 | 24.95 | 25.29 |
| DW (nm) | 568.92 | 480.62 | 582.85 | 487.95 | 585.96 | 478.18 | 581.60 | 572.24 | 585.04 | 483.91 | 550.56 |
| Pe (%) | 16.72 | 18.24 | 36.18 | 17.10 | 49.85 | 25.55 | 30.33 | 24.81 | 44.03 | 11.21 | 3.69 |

|  | Ex. 111 | Ex. 112 | Ex. 113 | Ex. 114 | Ex. 115 | Ex. 116 | Ex. 117 | Ex. 118 | Ex. 119 | Ex. 120 | Ex. 121 |
|---|---|---|---|---|---|---|---|---|---|---|---|
| FeO (wt. %) | 0.3185 | 0.2970 | 0.3600 | 0.2750 | 0.3263 | 0.3440 | 0.3395 | 0.2585 | 0.2925 | 0.2040 | 0.2183 |
| Total iron (wt. %) | 0.980 | 0.990 | 0.960 | 1.000 | 0.870 | 0.860 | 0.970 | 0.940 | 0.900 | 1.020 | 0.970 |
| Model redox | 0.3250 | 0.3000 | 0.3750 | 0.2750 | 0.3750 | 0.4000 | 0.3500 | 0.2750 | 0.3250 | 0.2000 | 0.2250 |
| Cr2O3 (wt. %) | 0.0240 | 0.0240 | 0.0250 | 0.0240 | 0.0270 | 0.0280 | 0.0240 | 0.0250 | 0.0260 | 0.0235 | 0.0230 |
| CoO (wt. %) | 0.0138 | 0.0144 | 0.0126 | 0.0150 | 0.0135 | 0.0131 | 0.0132 | 0.0155 | 0.0145 | 0.0172 | 0.0167 |
| Se (wt. %) | 0.0022 | 0.0021 | 0.0023 | 0.0020 | 0.0022 | 0.0022 | 0.0022 | 0.0020 | 0.0021 | 0.0018 | 0.0019 |
| TiO2 (wt. %) |  |  |  | 0.3000 | 0.4700 |  |  | 0.3000 | 0.3100 | 0.2600 | 0.2300 |
| LTA (%) | 25.04 | 25.06 | 25.07 | 25.08 | 25.08 | 25.08 | 25.08 | 25.08 | 25.09 | 25.09 | 25.09 |
| TSUV (%) | 14.95 | 14.39 | 16.20 | 13.84 | 16.42 | 16.44 | 15.57 | 13.87 | 15.07 | 11.78 | 12.79 |
| TSIR (%) | 13.98 | 15.73 | 11.18 | 17.75 | 13.41 | 12.18 | 12.48 | 19.46 | 16.12 | 26.47 | 24.41 |
| TSET (%) | 18.67 | 19.63 | 17.11 | 20.75 | 18.38 | 17.65 | 17.85 | 21.69 | 19.87 | 25.45 | 24.40 |
| DW (nm) | 551.23 | 551.01 | 550.87 | 551.07 | 550.51 | 550.63 | 550.87 | 550.87 | 550.95 | 550.70 | 550.83 |
| Pe (%) | 3.72 | 3.71 | 3.75 | 3.75 | 3.55 | 3.88 | 3.65 | 3.67 | 3.65 | 3.94 | 3.51 |

|  | Ex. 122 | Ex. 123 | Ex. 124 | Ex. 125 | Ex. 126 | Ex. 127 | Ex. 128 | Ex. 129 | Ex. 130 | Ex. 131 | Ex. 132 |
|---|---|---|---|---|---|---|---|---|---|---|---|
| FeO (wt. %) | 0.2400 | 0.3800 | 0.2525 | 0.3115 | 0.2295 | 0.2760 | 0.2250 | 0.1750 | 0.1750 | 0.2250 | 0.4250 |
| Total iron (wt. %) | 0.960 | 0.950 | 1.010 | 0.890 | 1.020 | 0.920 | 0.900 | 0.700 | 0.700 | 0.900 | 1.700 |
| Model redox | 0.2500 | 0.4000 | 0.2500 | 0.3500 | 0.2250 | 0.3000 | 0.2500 | 0.2500 | 0.2500 | 0.2500 | 0.2500 |
| Cr2O3 (wt. %) | 0.0240 | 0.0250 | 0.0240 | 0.0270 | 0.0240 | 0.0250 | 0.0250 | 0.0210 | 0.0210 | 0.0250 | 0.0250 |
| CoO (wt. %) | 0.0162 | 0.0120 | 0.0156 | 0.0140 | 0.0162 | 0.0150 | 0.0107 | 0.0070 | 0.0200 | 0.0107 | 0.0107 |
| Se (wt. %) | 0.0019 | 0.0023 | 0.0020 | 0.0021 | 0.0019 | 0.0020 | 0.0039 | 0.0046 | 0.0011 | 0.0032 | 0.0017 |
| TiO2 (wt. %) | 0.4200 |  |  | 0.4500 |  | 0.4300 | 0.2000 | 0.2000 | 0.2000 | 0.2000 | 0.2000 |
| LTA (%) | 25.10 | 25.13 | 25.15 | 25.17 | 25.19 | 25.27 | 25.52 | 26.35 | 27.45 | 28.15 | 28.38 |
| TSUV (%) | 12.80 | 16.85 | 13.34 | 15.24 | 12.83 | 14.09 | 12.33 | 12.71 | 27.65 | 14.33 | 9.99 |
| TSIR (%) | 21.59 | 10.06 | 20.12 | 14.53 | 22.90 | 17.66 | 23.68 | 31.33 | 31.49 | 23.80 | 8.20 |
| TSET (%) | 22.83 | 16.50 | 22.08 | 18.99 | 23.60 | 20.77 | 23.44 | 27.77 | 31.06 | 24.75 | 16.22 |
| DW (nm) | 550.53 | 551.00 | 550.49 | 550.57 | 551.12 | 550.65 | 579.95 | 584.02 | 480.17 | 577.51 | 545.94 |
| Pe (%) | 3.84 | 3.74 | 3.71 | 3.91 | 3.80 | 3.82 | 24.29 | 37.88 | 18.25 | 18.11 | 7.52 |

|  | Ex. 133 | Ex. 134 | Ex. 135 | Ex. 136 | Ex. 137 | Ex. 138 | Ex. 139 | Ex. 140 | Ex. 141 | Ex. 142 | Ex. 143 |
|---|---|---|---|---|---|---|---|---|---|---|---|
| FeO (wt. %) | 0.3750 | 0.4000 | 0.1750 | 0.3750 | 0.2250 | 0.3500 | 0.2250 | 0.2250 | 0.2250 | 0.3250 | 0.3600 |
| Total iron (wt. %) | 1.500 | 1.600 | 0.700 | 1.500 | 0.900 | 1.400 | 0.900 | 0.900 | 0.900 | 1.300 | 0.900 |
| Model redox | 0.2500 | 0.2500 | 0.2500 | 0.2500 | 0.2500 | 0.2500 | 0.2500 | 0.2500 | 0.2500 | 0.2500 | 0.4000 |
| Cr2O3 (wt. %) | 0.0250 | 0.0250 | 0.0210 | 0.0250 | 0.0250 | 0.0250 | 0.0800 | 0.0250 | 0.0700 | 0.0250 | 0.0250 |
| CoO (wt. %) | 0.0050 | 0.0107 | 0.0070 | 0.0107 | 0.0150 | 0.0107 | 0.0107 | 0.0107 | 0.0107 | 0.0107 | 0.0107 |
| Se (wt. %) | 0.0027 | 0.0017 | 0.0039 | 0.0017 | 0.0017 | 0.0017 | 0.0017 | 0.0025 | 0.0017 | 0.0017 | 0.0017 |
| TiO2 (wt. %) | 0.2000 | 0.2000 | 0.2000 | 0.2000 | 0.2000 | 0.2000 | 0.2000 | 0.2000 | 0.2000 | 0.2000 | 0.2000 |
| LTA (%) | 28.72 | 29.13 | 29.19 | 29.91 | 29.96 | 30.71 | 30.71 | 31.14 | 31.44 | 31.53 | 32.11 |

TABLE 1-continued

|  |  |  |  |  |  |  |  |  |  |  |
|---|---|---|---|---|---|---|---|---|---|---|
| TSUV (%) | 6.46 | 10.84 | 14.90 | 11.76 | 19.65 | 12.78 | 19.13 | 16.64 | 19.24 | 13.90 | 23.95 |
| TSIR (%) | 10.35 | 9.34 | 31.44 | 10.65 | 23.95 | 12.15 | 23.80 | 23.91 | 23.84 | 13.89 | 11.55 |
| TSET (%) | 16.56 | 17.23 | 29.09 | 18.35 | 26.65 | 19.59 | 25.48 | 26.29 | 25.96 | 20.97 | 20.75 |
| DW (nm) | 574.22 | 546.65 | 582.80 | 547.43 | 492.96 | 548.31 | 556.15 | 573.03 | 556.08 | 549.30 | 492.90 |
| Pe (%) | 32.55 | 7.16 | 31.42 | 6.80 | 4.27 | 6.44 | 11.87 | 11.83 | 10.56 | 6.07 | 5.63 |

|  | Ex. 144 | Ex. 145 | Ex. 146 | Ex. 147 | Ex. 148 | Ex. 149 | Ex. 150 | Ex. 151 | Ex. 152 | Ex. 153 | Ex. 154 |
|---|---|---|---|---|---|---|---|---|---|---|---|
| FeO (wt. %) | 0.2250 | 0.3000 | 0.1750 | 0.3375 | 0.2250 | 0.3150 | 0.1750 | 0.2750 | 0.2250 | 0.2925 | 0.2250 |
| Total iron (wt. %) | 0.900 | 1.200 | 0.700 | 0.900 | 0.900 | 0.900 | 0.700 | 1.100 | 0.900 | 0.900 | 0.900 |
| Model redox | 0.2500 | 0.2500 | 0.2500 | 0.3750 | 0.2500 | 0.3500 | 0.2500 | 0.2500 | 0.2500 | 0.3250 | 0.2500 |
| Cr2O3 (wt. %) | 0.0600 | 0.0250 | 0.0210 | 0.0250 | 0.0500 | 0.0250 | 0.0210 | 0.0250 | 0.0250 | 0.0250 | 0.0400 |
| CoO (wt. %) | 0.0107 | 0.0107 | 0.0070 | 0.0107 | 0.0107 | 0.0107 | 0.0150 | 0.0107 | 0.0107 | 0.0107 | 0.0107 |
| Se (wt. %) | 0.0017 | 0.0017 | 0.0032 | 0.0017 | 0.0017 | 0.0017 | 0.0011 | 0.0017 | 0.0020 | 0.0017 | 0.0017 |
| TiO2 (wt. %) | 0.2000 | 0.2000 | 0.2000 | 0.2000 | 0.2000 | 0.2000 | 0.2000 | 0.2000 | 0.2000 | 0.2000 | 0.2000 |
| LTA (%) | 32.20 | 32.37 | 32.44 | 32.57 | 32.99 | 33.05 | 33.22 | 33.24 | 33.52 | 33.54 | 33.80 |
| TSUV (%) | 19.35 | 15.15 | 17.46 | 23.17 | 19.46 | 22.43 | 27.83 | 16.52 | 18.52 | 21.72 | 19.57 |
| TSIR (%) | 23.89 | 15.90 | 31.55 | 13.01 | 23.93 | 14.68 | 31.64 | 18.23 | 24.00 | 16.58 | 23.98 |
| TSET (%) | 26.46 | 22.52 | 30.63 | 21.68 | 26.98 | 22.72 | 33.10 | 24.24 | 27.54 | 23.89 | 27.52 |
| DW (nm) | 555.97 | 550.42 | 581.19 | 495.48 | 555.80 | 499.55 | 483.52 | 551.73 | 565.70 | 507.34 | 555.55 |
| Pe (%) | 9.24 | 5.71 | 24.72 | 4.48 | 7.93 | 3.37 | 10.68 | 5.36 | 7.33 | 2.42 | 6.61 |

|  | Ex. 155 | Ex. 156 | Ex. 157 | Ex. 158 | Ex. 159 | Ex. 160 | Ex. 161 | Ex. 162 | Ex. 163 | Ex. 164 | Ex. 165 |
|---|---|---|---|---|---|---|---|---|---|---|---|
| FeO (wt. %) | 0.2700 | 0.2500 | 0.2475 | 0.2250 | 0.2250 | 0.2250 | 0.2250 | 0.2250 | 0.2250 | 0.2250 | 0.3038 |
| Total iron (wt. %) | 0.900 | 1.000 | 0.900 | 0.900 | 0.900 | 0.900 | 0.900 | 0.900 | 0.900 | 0.900 | 0.810 |
| Model redox | 0.3000 | 0.2500 | 0.2750 | 0.2500 | 0.2500 | 0.2500 | 0.2500 | 0.2500 | 0.2500 | 0.2500 | 0.3750 |
| Cr2O3 (wt. %) | 0.0250 | 0.0250 | 0.0250 | 0.0300 | 0.0250 | 0.0250 | 0.0250 | 0.0250 | 0.0250 | 0.0250 | 0.0270 |
| CoO (wt. %) | 0.0107 | 0.0107 | 0.0107 | 0.0107 | 0.0107 | 0.0107 | 0.0107 | 0.0107 | 0.0107 | 0.0107 | 0.0084 |
| Se (wt. %) | 0.0017 | 0.0017 | 0.0017 | 0.0017 | 0.0017 | 0.0017 | 0.0017 | 0.0017 | 0.0017 | 0.0017 | 0.0020 |
| TiO2 (wt. %) | 0.2000 | 0.2000 | 0.2000 | 0.2000 | 0.8000 | 0.7000 | 0.6000 | 0.5000 | 0.4000 | 0.3000 |  |
| LTA (%) | 34.03 | 34.14 | 34.54 | 34.63 | 34.75 | 34.80 | 34.85 | 34.91 | 34.96 | 35.01 | 35.02 |
| TSUV (%) | 21.03 | 18.05 | 20.38 | 19.69 | 16.79 | 17.24 | 17.72 | 18.20 | 18.70 | 19.22 | 24.83 |
| TSIR (%) | 18.74 | 20.92 | 21.22 | 24.03 | 24.05 | 24.05 | 24.05 | 24.05 | 24.05 | 24.05 | 15.60 |
| TSET (%) | 25.21 | 26.19 | 26.70 | 28.08 | 27.94 | 28.01 | 28.08 | 28.15 | 28.23 | 28.30 | 23.83 |
| DW (nm) | 524.51 | 553.17 | 544.21 | 555.15 | 562.59 | 561.76 | 560.81 | 559.69 | 558.39 | 556.81 | 550.61 |
| Pe (%) | 2.27 | 5.00 | 3.34 | 5.30 | 7.81 | 7.28 | 6.76 | 6.23 | 5.70 | 5.17 | 3.72 |

|  | Ex. 166 | Ex. 167 | Ex. 168 | Ex. 169 | Ex. 170 | Ex. 171 | Ex. 172 | Ex. 173 | Ex. 174 | Ex. 175 | Ex. 176 |
|---|---|---|---|---|---|---|---|---|---|---|---|
| FeO (wt. %) | 0.2050 | 0.1760 | 0.1680 | 0.2250 | 0.2250 | 0.2250 | 0.1868 | 0.2730 | 0.2550 | 0.2150 | 0.2365 |
| Total iron (wt. %) | 0.820 | 0.880 | 0.840 | 0.900 | 0.900 | 0.900 | 0.830 | 0.840 | 0.850 | 0.860 | 0.860 |
| Model redox | 0.2500 | 0.2000 | 0.2000 | 0.2500 | 0.2500 | 0.2500 | 0.2250 | 0.3250 | 0.3000 | 0.2500 | 0.2750 |
| Cr2O3 (wt. %) | 0.0250 | 0.0280 | 0.0270 | 0.0250 | 0.0250 | 0.0250 | 0.0270 | 0.0280 | 0.0280 | 0.0280 | 0.0280 |
| CoO (wt. %) | 0.0113 | 0.0119 | 0.0122 | 0.0107 | 0.0107 | 0.0107 | 0.0118 | 0.0092 | 0.0097 | 0.0108 | 0.0102 |
| Se (wt. %) | 0.0017 | 0.0016 | 0.0016 | 0.0017 | 0.0017 | 0.0017 | 0.0016 | 0.0019 | 0.0018 | 0.0017 | 0.0018 |
| TiO2 (wt. %) | 0.2200 |  | 0.1500 | 0.2000 | 0.2000 | 0.2000 | 0.3200 |  |  |  |  |
| LTA (%) | 35.03 | 35.05 | 35.05 | 35.06 | 35.06 | 35.06 | 35.08 | 35.09 | 35.09 | 35.10 | 35.11 |
| TSUV (%) | 21.12 | 20.29 | 20.31 | 19.75 | 19.75 | 19.75 | 20.17 | 23.31 | 22.65 | 21.54 | 21.99 |
| TSIR (%) | 26.90 | 31.69 | 33.17 | 24.05 | 24.05 | 24.05 | 29.82 | 18.43 | 20.35 | 25.42 | 22.54 |
| TSET (%) | 30.05 | 32.59 | 33.42 | 28.37 | 28.37 | 28.37 | 31.58 | 25.39 | 26.45 | 29.23 | 27.65 |
| DW (nm) | 550.96 | 550.65 | 550.80 | 554.86 | 554.86 | 554.86 | 550.80 | 550.76 | 550.70 | 550.37 | 550.89 |
| Pe (%) | 3.47 | 3.73 | 3.55 | 4.64 | 4.64 | 4.64 | 3.81 | 3.93 | 3.91 | 3.76 | 3.92 |

|  | Ex. 177 | Ex. 178 | Ex. 179 | Ex. 180 | Ex. 181 | Ex. 182 | Ex. 183 | Ex. 184 | Ex. 185 | Ex. 186 | Ex. 187 |
|---|---|---|---|---|---|---|---|---|---|---|---|
| FeO (wt. %) | 0.3200 | 0.2250 | 0.2870 | 0.1958 | 0.2228 | 0.2250 | 0.2730 | 0.2568 | 0.2888 | 0.2430 | 0.3040 |
| Total iron (wt. %) | 0.800 | 0.900 | 0.820 | 0.870 | 0.810 | 0.900 | 0.780 | 0.790 | 0.770 | 0.810 | 0.760 |
| Model redox | 0.4000 | 0.2500 | 0.3500 | 0.2250 | 0.2750 | 0.2500 | 0.3500 | 0.3250 | 0.3750 | 0.3000 | 0.4000 |
| Cr2O3 (wt. %) | 0.0270 | 0.0250 | 0.0270 | 0.0280 | 0.0260 | 0.0250 | 0.0260 | 0.0265 | 0.0260 | 0.0250 | 0.0255 |
| CoO (wt. %) | 0.0079 | 0.0107 | 0.0088 | 0.0113 | 0.0108 | 0.0107 | 0.0095 | 0.0098 | 0.0089 | 0.0104 | 0.0086 |
| Se (wt. %) | 0.0020 | 0.0017 | 0.0019 | 0.0017 | 0.0017 | 0.0017 | 0.0018 | 0.0018 | 0.0019 | 0.0017 | 0.0019 |
| TiO2 (wt. %) |  | 0.1000 |  |  | 0.3200 | 0.0200 | 0.4600 | 0.2900 | 0.2700 | 0.4900 | 0.4200 |
| LTA (%) | 35.11 | 35.11 | 35.12 | 35.13 | 35.15 | 35.15 | 35.16 | 35.17 | 35.18 | 35.20 | 35.21 |
| TSUV (%) | 25.59 | 20.29 | 24.15 | 20.91 | 21.34 | 20.74 | 22.52 | 22.73 | 24.12 | 20.99 | 24.01 |
| TSIR (%) | 14.29 | 24.05 | 17.08 | 28.33 | 24.35 | 24.05 | 18.45 | 20.16 | 16.93 | 21.77 | 15.59 |
| TSET (%) | 23.15 | 28.45 | 24.69 | 30.81 | 28.67 | 28.51 | 25.41 | 26.39 | 24.63 | 27.24 | 23.87 |
| DW (nm) | 550.75 | 552.42 | 551.11 | 550.97 | 550.59 | 549.96 | 550.81 | 550.78 | 550.91 | 550.73 | 550.79 |
| Pe (%) | 3.76 | 4.11 | 3.79 | 3.81 | 3.72 | 3.69 | 3.98 | 3.79 | 3.73 | 3.96 | 3.87 |

|  | Ex. 188 | Ex. 189 | Ex. 190 | Ex. 192 | Ex. 192 | Ex. 193 | Ex. 194 | Ex. 195 | Ex. 196 | Ex. 197 | Ex. 198 |
|---|---|---|---|---|---|---|---|---|---|---|---|
| FeO (wt. %) | 0.2250 | 0.2025 | 0.2250 | 0.1800 | 0.2250 | 0.1750 | 0.2250 | 0.2250 | 0.3500 | 0.3250 | 0.1750 |
| Total iron (wt. %) | 0.900 | 0.900 | 0.900 | 0.900 | 0.900 | 0.700 | 0.900 | 0.900 | 1.400 | 1.300 | 0.700 |

TABLE 1-continued

|  |  |  |  |  |  |  |  |  |  |  |
|---|---|---|---|---|---|---|---|---|---|---|
| Model redox | 0.2500 | 0.2250 | 0.2500 | 0.2000 | 0.2500 | 0.2500 | 0.2500 | 0.2500 | 0.2500 | 0.2500 | 0.2500 |
| Cr2O3 (wt. %) | 0.0200 | 0.0250 | 0.0250 | 0.0250 | 0.0250 | 0.0210 | 0.0100 | 0.0005 | 0.0210 | 0.0210 | 0.0210 |
| CoO (wt. %) | 0.0107 | 0.0107 | 0.0100 | 0.0107 | 0.0107 | 0.0070 | 0.0107 | 0.0107 | 0.0070 | 0.0070 | 0.0070 |
| Se (wt. %) | 0.0017 | 0.0017 | 0.0017 | 0.0017 | 0.0015 | 0.0025 | 0.0017 | 0.0017 | 0.0011 | 0.0011 | 0.0020 |
| TiO2 (wt. %) | 0.2000 | 0.2000 | 0.2000 | 0.2000 | 0.2000 | 0.2000 | 0.2000 | 0.2000 | 0.2000 | 0.2000 | 0.2000 |
| LTA (%) | 35.50 | 35.59 | 35.97 | 36.14 | 36.14 | 36.15 | 36.39 | 37.27 | 37.74 | 38.74 | 39.14 |
| TSUV (%) | 19.80 | 19.14 | 19.76 | 18.55 | 20.61 | 20.46 | 19.92 | 20.03 | 15.66 | 16.96 | 22.92 |
| TSIR (%) | 24.07 | 27.29 | 24.06 | 31.00 | 24.08 | 31.66 | 24.12 | 24.16 | 12.05 | 13.79 | 31.74 |
| TSET (%) | 28.67 | 30.27 | 28.68 | 32.42 | 28.96 | 32.46 | 29.28 | 29.89 | 22.48 | 23.95 | 33.97 |
| DW (nm) | 554.47 | 560.86 | 559.34 | 564.72 | 537.17 | 578.76 | 553.07 | 549.31 | 541.05 | 542.27 | 575.77 |
| Pe (%) | 3.99 | 5.98 | 5.81 | 7.33 | 2.96 | 17.83 | 2.68 | 1.44 | 5.63 | 5.36 | 12.83 |

|  | Ex. 199 | Ex. 200 | Ex. 201 | Ex. 202 | Ex. 203 | Ex. 204 | Ex. 205 | Ex. 206 | Ex. 207 | Ex. 208 | Ex. 209 |
|---|---|---|---|---|---|---|---|---|---|---|---|
| FeO (wt. %) | 0.1750 | 0.3000 | 0.1750 | 0.2250 | 0.1750 | 0.2750 | 0.1750 | 0.2500 | 0.1750 | 0.2800 | 0.1750 |
| Total iron (wt. %) | 0.700 | 1.200 | 0.700 | 0.900 | 0.700 | 1.100 | 0.700 | 1.000 | 0.700 | 0.700 | 0.700 |
| Model redox | 0.2500 | 0.2500 | 0.2500 | 0.2500 | 0.2500 | 0.2500 | 0.2500 | 0.2500 | 0.2500 | 0.4000 | 0.2500 |
| Cr2O3 (wt. %) | 0.0800 | 0.0210 | 0.0700 | 0.0250 | 0.0210 | 0.0210 | 0.0600 | 0.0210 | 0.0500 | 0.0210 | 0.0210 |
| CoO (wt. %) | 0.0070 | 0.0070 | 0.0070 | 0.0107 | 0.0100 | 0.0070 | 0.0070 | 0.0070 | 0.0070 | 0.0070 | 0.0070 |
| Se (wt. %) | 0.0011 | 0.0011 | 0.0011 | 0.0008 | 0.0011 | 0.0011 | 0.0011 | 0.0011 | 0.0011 | 0.0011 | 0.0015 |
| TiO2 (wt. %) | 0.2000 | 0.2000 | 0.2000 | 0.2000 | 0.2000 | 0.2000 | 0.2000 | 0.2000 | 0.2000 | 0.2000 | 0.2000 |
| LTA (%) | 39.29 | 39.76 | 40.23 | 40.24 | 40.32 | 40.81 | 41.21 | 41.90 | 42.22 | 42.25 | 42.45 |
| TSUV (%) | 27.23 | 18.38 | 27.37 | 23.94 | 28.00 | 19.95 | 27.52 | 21.68 | 27.67 | 32.61 | 25.67 |
| TSIR (%) | 31.55 | 15.80 | 31.61 | 24.20 | 31.79 | 18.13 | 31.66 | 20.83 | 31.72 | 17.65 | 31.82 |
| TSET (%) | 33.23 | 25.58 | 33.85 | 31.25 | 35.55 | 27.40 | 34.49 | 29.44 | 35.15 | 28.68 | 35.70 |
| DW (nm) | 555.78 | 543.64 | 555.68 | 494.01 | 494.99 | 545.18 | 555.53 | 546.93 | 555.32 | 494.20 | 569.54 |
| Pe (%) | 11.51 | 5.09 | 10.21 | 6.17 | 3.20 | 4.83 | 8.90 | 4.57 | 7.59 | 4.43 | 7.81 |

|  | Ex. 210 | Ex. 211 | Ex. 212 | Ex. 213 | Ex. 214 | Ex. 215 | Ex. 216 | Ex. 217 | Ex. 218 | Ex. 219 | Ex. 220 |
|---|---|---|---|---|---|---|---|---|---|---|---|
| FeO (wt. %) | 0.2625 | 0.2250 | 0.2450 | 0.1750 | 0.2250 | 0.2275 | 0.2000 | 0.2100 | 0.1750 | 0.1925 | 0.1750 |
| Total iron (wt. %) | 0.700 | 0.900 | 0.700 | 0.700 | 0.900 | 0.700 | 0.800 | 0.700 | 0.700 | 0.700 | 0.700 |
| Model redox | 0.3750 | 0.2500 | 0.3500 | 0.2500 | 0.2500 | 0.3250 | 0.2500 | 0.3000 | 0.2500 | 0.2750 | 0.2500 |
| Cr2O3 (wt. %) | 0.0210 | 0.0210 | 0.0210 | 0.0400 | 0.0250 | 0.0210 | 0.0210 | 0.0210 | 0.0300 | 0.0210 | 0.0210 |
| CoO (wt. %) | 0.0070 | 0.0070 | 0.0070 | 0.0070 | 0.0050 | 0.0070 | 0.0070 | 0.0070 | 0.0070 | 0.0070 | 0.0070 |
| Se (wt. %) | 0.0011 | 0.0011 | 0.0011 | 0.0011 | 0.0017 | 0.0011 | 0.0011 | 0.0011 | 0.0011 | 0.0011 | 0.0011 |
| TiO2 (wt. %) | 0.2000 | 0.2000 | 0.2000 | 0.2000 | 0.2000 | 0.2000 | 0.2000 | 0.2000 | 0.2000 | 0.2000 | 0.8000 |
| LTA (%) | 42.74 | 43.01 | 43.24 | 43.27 | 43.29 | 43.76 | 44.16 | 44.28 | 44.35 | 44.81 | 44.95 |
| TSUV (%) | 31.79 | 23.59 | 31.01 | 27.82 | 19.88 | 30.25 | 25.73 | 29.51 | 27.97 | 28.80 | 23.80 |
| TSIR (%) | 19.44 | 23.97 | 21.44 | 31.78 | 24.18 | 23.65 | 27.63 | 26.11 | 31.83 | 28.84 | 31.89 |
| TSET (%) | 29.79 | 31.73 | 31.01 | 35.85 | 31.10 | 32.35 | 34.32 | 33.83 | 36.57 | 35.46 | 36.68 |
| DW (nm) | 496.90 | 548.91 | 501.21 | 555.00 | 570.22 | 509.20 | 551.16 | 525.66 | 554.49 | 543.44 | 562.94 |
| Pe (%) | 3.54 | 4.31 | 2.70 | 6.29 | 14.10 | 2.01 | 4.06 | 2.00 | 4.99 | 2.82 | 6.99 |

|  | Ex. 221 | Ex. 222 | Ex. 223 | Ex. 224 | Ex. 225 | Ex. 226 | Ex. 227 | Ex. 228 | Ex. 229 | Ex. 230 | Ex. 231 |
|---|---|---|---|---|---|---|---|---|---|---|---|
| FeO (wt. %) | 0.1750 | 0.2210 | 0.1440 | 0.2600 | 0.2380 | 0.2100 | 0.2345 | 0.1460 | 0.1953 | 0.1750 | 0.1725 |
| Total iron (wt. %) | 0.700 | 0.680 | 0.720 | 0.650 | 0.680 | 0.700 | 0.670 | 0.730 | 0.710 | 0.700 | 0.690 |
| Model redox | 0.2500 | 0.3250 | 0.2000 | 0.4000 | 0.3500 | 0.3000 | 0.3500 | 0.2000 | 0.2750 | 0.2500 | 0.2500 |
| Cr2O3 (wt. %) | 0.0210 | 0.0210 | 0.0240 | 0.0250 | 0.0250 | 0.0255 | 0.0215 | 0.0245 | 0.0255 | 0.0210 | 0.0230 |
| CoO (wt. %) | 0.0070 | 0.0060 | 0.0079 | 0.0047 | 0.0053 | 0.0060 | 0.0057 | 0.0077 | 0.0064 | 0.0070 | 0.0070 |
| Se (wt. %) | 0.0011 | 0.0012 | 0.0010 | 0.0013 | 0.0013 | 0.0012 | 0.0012 | 0.0010 | 0.0011 | 0.0011 | 0.0011 |
| TiO2 (wt. %) | 0.7000 | 0.2000 | 0.2000 |  |  |  | 0.3000 |  |  | 0.6000 | 0.1500 |
| LTA (%) | 45.01 | 45.03 | 45.04 | 45.05 | 45.06 | 45.07 | 45.07 | 45.07 | 45.07 | 45.08 | 45.10 |
| TSUV (%) | 24.47 | 30.09 | 26.82 | 34.11 | 32.22 | 30.62 | 30.22 | 27.82 | 29.87 | 25.16 | 28.73 |
| TSIR (%) | 31.89 | 24.54 | 38.12 | 19.73 | 22.30 | 26.10 | 22.75 | 37.68 | 28.38 | 31.89 | 32.33 |
| TSET (%) | 36.77 | 33.15 | 40.43 | 30.51 | 31.90 | 33.96 | 32.14 | 40.25 | 35.20 | 36.86 | 37.40 |
| DW (nm) | 562.02 | 550.93 | 551.27 | 550.47 | 550.26 | 550.86 | 550.56 | 550.90 | 550.41 | 560.95 | 551.62 |
| Pe (%) | 6.46 | 3.55 | 3.78 | 3.71 | 3.76 | 3.87 | 3.72 | 3.59 | 3.79 | 5.93 | 3.61 |

|  | Ex. 232 | Ex. 233 | Ex. 234 | Ex. 235 | Ex. 236 | Ex. 237 | Ex. 238 | Ex. 239 | Ex. 240 | Ex. 241 | Ex. 242 |
|---|---|---|---|---|---|---|---|---|---|---|---|
| FeO (wt. %) | 0.2513 | 0.1800 | 0.1750 | 0.2243 | 0.1643 | 0.1750 | 0.2475 | 0.2560 | 0.1750 | 0.1925 | 0.2070 |
| Total iron (wt. %) | 0.670 | 0.720 | 0.700 | 0.690 | 0.730 | 0.700 | 0.660 | 0.640 | 0.700 | 0.700 | 0.690 |
| Model redox | 0.3750 | 0.2500 | 0.2500 | 0.3250 | 0.2250 | 0.2500 | 0.3750 | 0.4000 | 0.2500 | 0.2750 | 0.3000 |
| Cr2O3 (wt. %) | 0.0255 | 0.0245 | 0.0210 | 0.0255 | 0.0245 | 0.0210 | 0.0210 | 0.0215 | 0.0210 | 0.0230 | 0.0210 |
| CoO (wt. %) | 0.0049 | 0.0068 | 0.0070 | 0.0056 | 0.0072 | 0.0070 | 0.0054 | 0.0052 | 0.0070 | 0.0066 | 0.0064 |
| Se (wt. %) | 0.0013 | 0.0011 | 0.0011 | 0.0012 | 0.0011 | 0.0011 | 0.0012 | 0.0012 | 0.0011 | 0.0011 | 0.0011 |
| TiO2 (wt. %) |  |  | 0.5000 |  |  | 0.4000 | 0.4200 | 0.5200 | 0.3000 | 0.2000 | 0.3800 |
| LTA (%) | 45.12 | 45.13 | 45.15 | 45.15 | 45.17 | 45.21 | 45.22 | 45.27 | 45.28 | 45.29 | 45.35 |
| TSUV (%) | 33.06 | 29.08 | 25.86 | 31.45 | 28.35 | 26.59 | 30.17 | 30.49 | 27.34 | 28.78 | 28.32 |
| TSIR (%) | 20.71 | 30.96 | 31.89 | 24.08 | 33.90 | 31.89 | 21.16 | 20.19 | 31.89 | 28.84 | 26.57 |
| TSET (%) | 31.04 | 36.65 | 36.96 | 32.90 | 38.24 | 37.05 | 31.29 | 30.75 | 37.15 | 35.54 | 34.31 |

TABLE 1-continued

|         |        |        |        |        |        |        |        |        |        |        |        |
|---------|--------|--------|--------|--------|--------|--------|--------|--------|--------|--------|--------|
| DW (nm) | 550.70 | 550.88 | 559.66 | 550.68 | 550.94 | 558.12 | 550.89 | 550.76 | 556.18 | 550.70 | 550.64 |
| Pe (%)  | 3.88   | 3.72   | 5.40   | 3.87   | 3.71   | 4.87   | 3.90   | 4.01   | 4.35   | 3.77   | 3.80   |

|                    | Ex. 243 | Ex. 244 | Ex. 245 | Ex. 246 | Ex. 247 | Ex. 248 | Ex. 249 | Ex. 250 | Ex. 251 | Ex. 252 | Ex. 253 |
|--------------------|---------|---------|---------|---------|---------|---------|---------|---------|---------|---------|---------|
| FeO (wt. %)        | 0.1750  | 0.1750  | 0.1750  | 0.1620  | 0.1750  | 0.1750  | 0.1750  | 0.1575  | 0.1400  | 0.1500  | 0.1750  |
| Total iron (wt. %) | 0.700   | 0.700   | 0.700   | 0.720   | 0.700   | 0.700   | 0.700   | 0.700   | 0.700   | 0.600   | 0.700   |
| Model redox        | 0.2500  | 0.2500  | 0.2500  | 0.2250  | 0.2500  | 0.2500  | 0.2500  | 0.2250  | 0.2000  | 0.2500  | 0.2500  |
| Cr2O3 (wt. %)      | 0.0210  | 0.0210  | 0.0210  | 0.0220  | 0.0210  | 0.0200  | 0.0210  | 0.0210  | 0.0210  | 0.0210  | 0.0100  |
| CoO (wt. %)        | 0.0070  | 0.0070  | 0.0070  | 0.0075  | 0.0070  | 0.0070  | 0.0070  | 0.0070  | 0.0070  | 0.0070  | 0.0070  |
| Se (wt. %)         | 0.0011  | 0.0011  | 0.0011  | 0.0010  | 0.0011  | 0.0011  | 0.0011  | 0.0011  | 0.0011  | 0.0011  | 0.0011  |
| TiO2 (wt. %)       | 0.2000  | 0.2000  | 0.2000  | 0.3000  | 0.1000  | 0.2000  | 0.2000  | 0.2000  | 0.2000  | 0.2000  | 0.2000  |
| LTA (%)            | 45.35   | 45.35   | 45.35   | 45.35   | 45.42   | 45.46   | 45.47   | 45.90   | 46.46   | 46.57   | 46.61   |
| TSUV (%)           | 28.11   | 28.11   | 28.11   | 26.77   | 28.90   | 28.12   | 29.56   | 27.44   | 26.79   | 30.79   | 28.28   |
| TSIR (%)           | 31.89   | 31.89   | 31.89   | 34.36   | 31.89   | 31.89   | 31.89   | 35.28   | 39.06   | 36.86   | 31.95   |
| TSET (%)           | 37.25   | 37.25   | 37.25   | 38.55   | 37.35   | 37.33   | 37.43   | 39.23   | 41.41   | 40.58   | 38.11   |
| DW (nm)            | 553.71  | 553.71  | 553.71  | 550.30  | 550.44  | 553.59  | 546.98  | 559.73  | 563.70  | 556.63  | 551.69  |
| Pe (%)             | 3.82    | 3.82    | 3.82    | 3.71    | 3.29    | 3.69    | 2.87    | 4.84    | 5.88    | 3.57    | 2.39    |

|                    | Ex. 254 | Ex. 255 | Ex. 256 |
|--------------------|---------|---------|---------|
| FeO (wt. %)        | 0.1750  | 0.1750  | 0.1750  |
| Total iron (wt. %) | 0.700   | 0.700   | 0.700   |
| Model redox        | 0.2500  | 0.2500  | 0.2500  |
| Cr2O3 (wt. %)      | 0.0210  | 0.0005  | 0.0210  |
| CoO (wt. %)        | 0.0070  | 0.0070  | 0.0050  |
| Se (wt. %)         | 0.0008  | 0.0011  | 0.0011  |
| TiO2 (wt. %)       | 0.2000  | 0.2000  | 0.2000  |
| LTA (%)            | 47.69   | 47.75   | 49.07   |
| TSUV (%)           | 30.09   | 28.43   | 28.18   |
| TSIR (%)           | 31.93   | 32.01   | 31.95   |
| TSET (%)           | 38.53   | 38.89   | 38.50   |
| DW (nm)            | 509.82  | 545.77  | 565.18  |
| Pe (%)             | 2.14    | 1.16    | 7.39    |

TABLE 2

|                    | Ex. 257 | Ex. 258 | Ex. 259 | Ex. 260 | Ex. 261 | Ex. 262 | Ex. 263 | Ex. 264 | Ex. 265 |
|--------------------|---------|---------|---------|---------|---------|---------|---------|---------|---------|
| FeO (wt. %)        | 0.3232  | 0.2980  | 0.3080  | 0.2980  | 0.3500  | 0.2890  | 0.3500  | 0.3500  | 0.3080  |
| Total iron (wt. %) | 1.103   | 1.103   | 1.100   | 1.103   | 1.083   | 1.070   | 1.083   | 1.083   | 1.100   |
| Model redox        | 0.2929  | 0.2702  | 0.2800  | 0.2702  | 0.3232  | 0.2701  | 0.3232  | 0.3232  | 0.2800  |
| Cr2O3 (wt. %)      | 0.0302  | 0.0302  | 0.0302  | 0.0302  | 0.0293  | 0.0302  | 0.0293  | 0.0293  | 0.0302  |
| CoO (wt. %)        | 0.0128  | 0.0125  | 0.0128  | 0.0119  | 0.0110  | 0.0119  | 0.0100  | 0.0090  | 0.0100  |
| Se (wt. %)         | 0.0010  | 0.0010  | 0.0010  | 0.0009  | 0.0010  | 0.0009  | 0.0010  | 0.0010  | 0.0010  |
| TiO2 (wt. %)       | 0.1940  | 0.1940  | 0.1940  | 0.1940  | 0.1940  | 0.1940  | 0.3510  | 0.3510  | 0.1940  |
| LTA (%)            | 31.13   | 31.95   | 32.59   | 33.18   | 33.47   | 33.52   | 34.63   | 35.84   | 35.87   |
| TSUV (%)           | 16.53   | 15.93   | 20.62   | 16.28   | 19.74   | 16.79   | 19.76   | 19.78   | 20.69   |
| TSIR (%)           | 12.31   | 14.26   | 13.45   | 14.27   | 10.54   | 15.05   | 10.54   | 10.55   | 13.47   |
| TSET (%)           | 21.38   | 22.72   | 22.93   | 23.23   | 21.37   | 23.84   | 21.74   | 22.12   | 23.98   |
| DW (nm)            | 497.4   | 502.2   | 493.5   | 502.5   | 497.8   | 502.1   | 502.2   | 509.2   | 505.2   |
| Pe (%)             | 6.57    | 5.03    | 6.86    | 5.14    | 5.59    | 5.1     | 4.52    | 3.69    | 3.75    |

TABLE 3

|                    | Ex. 266 | Ex. 267 | Ex. 268 | Ex. 269 |
|--------------------|---------|---------|---------|---------|
| FeO (wt. %)        | 0.3060  | 0.3080  | 0.3400  | 0.3500  |
| Total iron (wt. %) | 1.099   | 1.103   | 1.101   | 1.110   |
| Redox              | 0.2790  | 0.2800  | 0.3100  | 0.3160  |
| Cr2O3 (wt. %)      | 0.0286  | 0.0302  | 0.0288  | 0.0323  |
| CoO (wt. %)        | 0.0128  | 0.0128  | 0.0129  | 0.0129  |
| Se (wt. %)         | 0.0012  | 0.0010  | 0.0008  | 0.0007  |
| TiO2 (wt. %)       | 0.3550  | 0.1940  | 0.3500  | 0.1940  |
| LTA ( %)           | 28.33   | 29.47   | 29.91   | 30.25   |
| TSUV (%)           | 14.14   | 15.72   | 16.28   | 19.16   |
| TSIR (%)           | 12.99   | 12.72   | 10.44   | 9.31    |
| TSET (%)           | 19.56   | 20.12   | 19.13   | 18.93   |
| DW (nm)            | 509.2   | 497.2   | 494.2   | 491.1   |
| Pe (%)             | 4.06    | 5.59    | 8.89    | 11.88   |

Referring to Tables 1, 2 and 3, the present invention provides a green colored glass using a standard soda-lime-silica glass base composition and additionally iron, cobalt, selenium and chromium, and optionally titanium, as infrared and ultraviolet radiation absorbing materials and colorants. As may be seen, not all of the examples are the same color, as indicated by the dominant wavelength (DW) and excitation purity (Pe). In the present invention, it is preferred that the glass have a color characterized by a dominant wavelength in the range of about 480 to 565 nanometers, preferably about 495 to 560 nanometers, with an excitation purity of no higher than about 20%, preferably no higher than about 10%, and more preferably no higher than about 7%. It is anticipated that the color of the glass may vary within this dominant wavelength range to provide a desired product. For example, a green blue glass may be produced at a dominant wavelength of about 485 to 515 nanometers, preferably about 490 to 510 nanometers, with an excitation purity of no higher than 10%, preferably not higher than 7%, while a green yellow glass may be produced at a dominant wavelength of about 535 to 565 nanometers, preferably about 540 to 560 nanometers, with an excitation purity of no higher than 10%, preferably not higher than 5%.

The green colored, infrared and ultraviolet radiation absorbing glasses disclosed in the present invention have a luminous transmittance (LTA) of up to 60 percent. In one particular embodiment, the glasses include about 0.6 to 4 wt. % total iron, about 0.13 to 0.9 wt. % FeO, about 40 to 500 PPM CoO, about 5 to 70 PPM Se, about 15 to 800 PPM $Cr_2O_3$ and 0.02 to about 1 wt. % $TiO_2$. In another embodiment, the glasses include about 1 to less than 1.4 wt. % total iron, about 0.2 to 0.60 wt. % FeO, greater than 200 to about 500 PPM CoO, about 5 to 70 PPM Se, greater than 200 to about 800 PPM $Cr_2O_3$ and 0 to about 1 wt. % $TiO_2$. The redox ratio for these glasses is maintained between about 0.20 to 0.40, preferably between about 0.22 to 0.35, more preferably between about 0.23 to 0.28. These glass compositions also have a TSUV of no greater than about 40%, preferably no greater than about 35%, a TSIR of no greater than about 45%, preferably no greater than about 40%, and a TSET of no greater than about 50%, preferably no greater than about 45%.

The glass compositions of the present invention may be provided with varying levels of spectral performance, depending on the particular application and desired luminous transmittance. In one embodiment of the invention, for a green colored, infrared and ultraviolet radiation absorbing glass having an LTA of less than 20% at at least one thickness in the range of 1.8 to 5.0 mm, the glass composition includes about 1 to less than 1.4 wt. % total iron; about 0.22 to 0.5 wt. %, preferably about 0.3 to 0.5 wt. %; greater than 200 to about 450 PPM CoO, preferably greater than 200 to about 350 PPM; about 10 to 60 PPM Se, preferably about 35 to 50 PPM; about 250 to 400 PPM $Cr_2O_3$, preferably about 250 to 350 PPM; and 0 to about 1 wt. % $TiO_2$, preferably about 0.02 to 0.5 wt. %. The glass compositions within this luminous transmittance range have a TSUV of no greater than about 30%, preferably no greater than about 12%, a TSIR of no greater than about 35%, preferably no greater than about 20%, and a TSET of no greater than about 30%, preferably no greater than about 20%.

In another embodiment of the invention, for a green colored, infrared and ultraviolet radiation absorbing glass having an LTA of less than 20 to 60% at at least one thickness in the range of 1.8 to 5.0 mm, the glass composition includes about 1 to less than 1.4 wt. % total iron; about 0.25 to 0.4 wt. %; greater than 200 to about 250 PPM CoO; about 10 to 30 PPM Se; greater than 200 to about 250 PPM $Cr_2O_3$, preferably about 250 to 350 PPM; and about 0.02 to 0.5 wt. % $TiO_2$. The glass compositions within this luminous transmittance range have a TSUV of no greater than about 35%, preferably no greater than about 20%, a TSIR of no greater than about 40%, preferably no greater than about 15%, and a TSET of no greater than about 45%, preferably, no greater than about 25%.

In another embodiment of the invention, for a green colored, infrared and ultraviolet radiation absorbing glass having an LTA of 20 to 60% at a reference thickness of 4.06 mm, the glass composition includes greater than 0.7 to about 2 wt. % total iron, preferably about 0.8 to 1.5 wt. %; about 0.13 to 0.6 wt. % FeO, preferably about 0.14 to 0.43 wt. %; greater than 200 to about 300 PPM CoO, preferably greater than 200 to about 250 PPM; about 5 to 70 PPM Se, preferably about 8 to 60 PPM; greater than 200 to about 300 PPM $Cr_2O_3$, preferably greater than 200 to about 250 PPM; and 0 to about 1 wt. % $TiO_2$, preferably about 0.02 to 0.5 wt. %. The glass compositions within this luminous transmittance range have a TSUV of no greater than about 35%, a TSIR of no greater than about 40%, and a TSET of no greater than about 45%.

In another embodiment of the invention, the green colored, infrared and ultraviolet radiation absorbing glass composition includes 0.9 to 1.3 wt. % total iron, preferably 1.083 to 1.11 wt. %; 0.25 to 0.40 wt. % FeO, preferably 0.306 to 0.35 wt. %; 80 to 130 PPM CoO, preferably 90 to 128 PPM; 8 to 15 PPM Se, preferably 10 to 12 PPM; 250 to 350 PPM $Cr_2O_3$, preferably 286 to 302 PPM; and 0.1 to 0.5 wt. % $TiO_2$, preferably 0.194 to 0.355 wt. %. These glasses have a luminous transmittance (LTA) of 25 to 40 percent, a total solar ultraviolet transmittance (TSUV) of about 25 percent or less, a total solar infrared transmittance (TSIR) of about 20 percent or less and a total solar energy transmittance (TSET) of about 30 percent or less.

It is expected that the spectral properties of the glass compositions disclosed herein will change after tempering the glass and further upon prolonged exposure to ultraviolet radiation, commonly referred to as solarization. In particular, it is believed that tempering and solarization of the glass compositions disclosed herein will increase the LTA and reduce the TSUV, TSIR and TSET. As a result, in one embodiment of the invention, a glass composition may have selected spectral properties that initially fall outside the desired ranges previously discussed but fall within the desired ranges after tempering and/or solarization.

Glass made by the float process typically ranges from a sheet thickness of about 1 millimeters to 10 millimeters. For vehicle glazing applications, it is preferred that the glass sheets having a composition and spectral properties as disclosed herein have a thickness within the range of 0.071 to 0.197 inches (1.8 to 5 mm). It is anticipated that when using a single glass ply, the glass will be tempered, e.g. for an automotive side or rear window, and when multiple plies are used, the glass will be annealed and laminated together using a thermoplastic adhesive, such as polyvinyl butyral.

It is contemplated that vanadium may be used as a partial or complete replacement for the chromium in the glass compositions of the present inventions. More specifically, vanadium, which is expressed herein in terms of $V_2O_5$, imparts a yellow-green color to the glass and absorbs both ultraviolet and infrared radiation at different valence states. It is believed that $Cr_2O_3$ in the range of about 25 to 800 PPM discussed above may be completely replaced by about 0.01 to 0.32 wt. % $V_2O_5$.

As discussed earlier, other materials may also be added to the glass compositions disclosed herein to further reduce infrared and ultraviolet radiation transmission and/or control glass color. In particular, it is contemplated that the following materials may be added to the iron, cobalt, selenium, chromium and titanium containing soda-lime-silica glass disclosed herein:

| | |
|---|---|
| $MnO_2$ | 0 to 0.5 wt. % |
| $SnO_2$ | 0 to 2 wt. % |
| ZnO | 0 to 0.5 wt. % |
| $Nd_2O_3$ | 0 to about 0.5 wt. % |
| Mo | 0 to 0.015 wt. % |
| $CeO_2$ | 0 to 2 wt. % |
| NiO | 0 to 0.1 wt. % |
| CuO | 0 to 2 wt. % with a reduction in |

-continued

| | |
|---|---|
| the amount of CoO of 1 ppm for every 6 ppm of CuO | |

As should be appreciated, adjustments may have to be made to the basic iron, cobalt, selenium, chromium and/or titanium constituents to account for any coloring and/or redox affecting power of these additional materials.

Depending on the type of melting operation, sulfur may be added to the batch materials of a soda-lime-silica glass as a melting and refining aid. Commercially produced float glass may include up to about 0.3 wt. % $SO_3$. In a glass composition that includes iron and sulfur, providing reducing conditions may create amber coloration which lowers luminous transmittance as discussed in U.S. Pat. No. 4,792,536 to Pecoraro, et al. However, it is believed that the reducing conditions required to produce this coloration in float glass compositions of the type disclosed herein are limited to approximately the first 20 microns of the lower glass surface contacting the molten tin during the float forming operation, and to a lesser extent, to the exposed upper glass surface. Because of the low sulfur content and the limited region of the glass in which any coloration could occur, depending on the particular soda-lime-silica-glass composition, sulfur in these surfaces has little if any material effect on the glass color or spectral properties.

Other variations as are known to those skilled in the art may be resorted to without departing from the scope of the invention as defined by the claims that follow.

We claim:

1. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion comprising:

| | |
|---|---|
| total iron | about 0.60 to 4 percent by weight, |
| FeO | about 0.13 to 0.9 percent by weight, |
| CoO | about 40 to 500 PPM, |
| Se | about 5 to 70 PPM, |
| $Cr_2O_3$ | about 15 to 800 PPM, and |
| $TiO_2$ | 0.1 to 1 percent by weight, | the glass having a luminous transmittance (LTA) of up to about 60 percent, a total solar ultraviolet transmittance (TSUV) of about 40 percent or less, a total solar infrared transmittance (TSIR) of about 45 percent or less and a total solar energy transmittance (TSET) of about 50 percent or less and a dominant wavelength in the range of about 480 to 565 nanometers for any one thickness in the range from 1 to 10 millimeters.

2. The article as in claim 1 wherein the glass has a redox of about 0.2 to 0.4.

3. The article as in claim 1 wherein the glass has a total solar ultraviolet transmittance (TSUV) of about 35 percent or less, a total solar infrared transmittance (TSIR) of about 40 percent or less and a total solar energy transmittance (TSET) of about 45 percent or less.

4. The article as in claim 1 wherein the glass has an excitation purity of no higher than about 20 percent.

5. The article as in claim 4 wherein the color of the glass is characterized by a dominant wavelength in the range of about 485 to 515 nanometers and an excitation purity of no higher than about 10 percent.

6. The article as in claim 5 wherein the color of the glass is characterized by a dominant wavelength in the range of about 490 to 510 nanometers and an excitation purity of no higher than about 7 percent.

7. The article as in claim 4 wherein the color of the glass is characterized by a dominant wavelength in the range of about 535 to 565 nanometers and an excitation purity of no higher than about 10 percent.

8. The article as in claim 7 wherein the color of the glass is characterized by a dominant wavelength in the range of about 540 to 560 nanometers and an excitation purity of no higher than about 5 percent.

9. The article as in claim 1 wherein the glass has a luminous transmittance of less than 20 percent at at least one thickness in the range of 1.8 to 5.0 mm.

10. The article as in claim 1 wherein the glass has a luminous transmittance of 20 to 60 percent at at least one thickness in the range of 1.8 to 5.0 mm.

11. The article as in claim 1 comprising a flat glass sheet.

12. The article as in claim 11 wherein said sheet has traces of tin oxide in a surface portion.

13. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion consisting essentially of:

| | |
|---|---|
| total iron | 1 to less than 1.4 percent by weight, |
| FeO | about 0.2 to 0.6 percent by weight, |
| CoO | greater than 250 to about 500 PPM, |
| Se | about 5 to 70 PPM, |
| $Cr_2O_3$ | greater than 200 to about 800 PPM, and |
| $TiO_2$ | 0 to about 1 percent by weight, | the glass having a luminous transmittance (LTA) of up to about 60 percent, a total solar ultraviolet transmittance (TSUV) of about 40 percent or less, a total solar infrared transmittance (TSIR) of about 45 percent or less and a total solar energy transmittance (TSET) of about 50 percent or less, wherein the color of the glass is characterized by a dominant wavelength in the range of about 480 to 565 nanometers and an excitation purity of no higher than about 20 percent for any one thickness in the range from 1 to 10 millimeters.

14. The article as in claim 13 wherein the glass has a redox of about 0.2 to 0.4.

15. The article as in claim 13 wherein the glass has a total solar ultraviolet transmittance (TSUV) of about 35 percent or less, a total solar infrared transmittance (TSIR) of about 40 percent or less and a total solar energy transmittance (TSET) of about 45 percent or less.

16. The article as in claim 13 wherein the color of the glass is characterized by a dominant wavelength in the range of about 485 to 515 nanometers and an excitation purity of no higher than about 10 percent.

17. The article as in claim 16 wherein the color of the glass is characterized by a dominant wavelength in the range of about 490 to 510 nanometers and an excitation purity of no higher than about 7 percent.

18. The article as in claim 13 wherein the color of the glass is characterized by a dominant wavelength in the range of about 535 to 565 nanometers and an excitation purity of no higher than about 10 percent.

19. The article as in claim 18 wherein the color of the glass is characterized by a dominant wavelength in the range of about 540 to 560 nanometers and an excitation purity of no higher than about 5 percent.

20. The article as in claim 13 wherein the glass has a luminous transmittance of less than 20 percent at at least one thickness in the range of 1.8 to 5.0 mm.

21. The article as in claim 20 wherein the Feo concentration is from about 0.22 to 0.5 weight percent, the CoO concentration is greater than 250 to about 450 PPM, the Se concentration is about 10 to 60 PPM, the $Cr_2O_3$ concentration is about 250 to 400 PPM, and the $TiO_2$ concentration is about 0.02 to 0.5 weight percent.

22. The article as in claim 21 wherein the FeO concentration is from about 0.3 to 0.5 weight percent, the CoO concentration is greater than 250 to about 350 PPM, the Se concentration is about 35 to 50 PPM, and the $Cr_2O_3$ concentration is about 250 to 350 PPM.

23. The article as in claim 21 wherein the glass has a total solar ultraviolet transmittance (TSUV) of about 30 percent or less, a total solar infrared transmittance (TSIR) of about 35 percent or less and a total solar energy transmittance (TSET) of about 30 percent or less.

24. The article as in claim 23 wherein the glass has a total solar ultraviolet transmittance (TSUV) of about 12 percent or less, a total solar infrared transmittance (TSIR) of about 20 percent or less and a total solar energy transmittance (TSET) of about 20 percent or less.

25. The article as in claim 21 wherein the color of the glass is characterized by a dominant wavelength in the range of about 540 to 560 nanometers and an excitation purity of no higher than about 5 percent.

26. The article as in claim 13 wherein the glass has a luminous transmittance of 20 to 60 percent at at least one thickness in the range of 1.8 to 5.0 mm.

27. The article as in claim 26 wherein the FeO concentration is from about 0.25 to 0.4 weight percent, the CoO concentration is greater than 250 to about 450 PPM, the Se concentration is about 10 to 30 PPM, the $Cr_2O_3$ concentration is greater than 200 to about 250 PPM, and the $TiO_2$ concentration is about 0.02 to 0.5 weight percent.

28. The article as in claim 27 wherein the glass has a total solar ultraviolet transmittance (TSUV) of about 35 percent or less, a total solar infrared transmittance (TSIR) of about 40 percent or less and a total solar energy transmittance (TSET) of about 45 percent or less.

29. The article as in claim 28 wherein the glass has a total solar ultraviolet transmittance (TSUV) of about 20 percent or less, a total solar infrared transmittance (TSIR) of about 15 percent or less and a total solar energy transmittance (TSET) of about 25 percent or less.

30. The article as in claim 27 wherein the color of the glass is characterized by a dominant wavelength in the range of about 490 to 510 nanometers and an excitation purity of no higher than about 7 percent.

31. The article as in claim 13 comprising a flat glass sheet.

32. The article as in claim 31 wherein said sheet has traces of tin oxide in a surface portion.

33. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion comprising:

total iron greater than 0.7 to about 2 percent by weight,

| | |
|---|---|
| FeO | about 0.13 to 0.6 percent by weight, |
| CoO | greater than 250 to about 300 PPM, |
| Se | 5 to 70 PPM, |
| $Cr_2O_3$ | greater than 200 to about 300 PPM, and |
| $TiO_2$ | 0 to about 1 percent by weight, | the glass having a luminous transmittance (LTA) of 20 to 60 percent, a total solar ultraviolet transmittance (TSUV) of about 35 percent or less, a total solar infrared transmittance (TSIR) of about 40 percent or less and a total solar energy transmittance (TSET) of about 45 percent or less at a reference thickness of 4.06 mm, wherein the color of the glass is characterized by a dominant wavelength in the range of about 480 to 565 nanometers and an excitation purity of no higher than about 20 percent.

34. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion comprising:

| | |
|---|---|
| total iron | from 0.8 to 1.5 weight percent |
| FeO | about 0.14 to 0.43 weight percent, |
| CoO | greater than 200 to about 250 PPM, |
| Se | 27 to 60 PPM, |
| $Cr_2O_3$ | greater than 200 to about 250 PPM, and |
| $TiO_2$ | 0.02 to 0.5 weight percent, | the glass having a luminous transmittance (LTA) of 20 to 60 percent, a total solar ultraviolet transmittance (TSUV) of about 35 percent or less, a total solar infrared transmittance (TSIR) of about 40 percent or less and a total solar energy transmittance (TSIT) of about 45 percent or less at a reference thickness of 4.06 mm, wherein the color of the glass is characterized by a dominant wavelength in the range of about 480 to 565 nanometers and an excitation purity of no higher than about 20 percent.

35. The article as in claim 33 wherein the color of the glass is characterized by a dominant wavelength in the range of about 490 to 510 nanometers and an excitation purity of no higher than about 7 percent.

36. The article as in claim 33 wherein the glass has a redox of about 0.2 to 0.4.

37. The article as in claim 33 comprising a flat glass sheet.

38. The article as in claim 37 wherein said sheet has traces of tin oxide in a surface portion.

39. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion comprising:

| | |
|---|---|
| total iron | 0.9 to 1.3 percent by weight, |
| FeO | 0.25 to 0.40 percent by weight, |
| CoO | 80 to 130 PPM, |
| Se | 8 to 15 PPM, |
| $Cr_2O_3$ | 250 to 350 PPM, and |
| $TiO_2$ | 0.1 to 0.5 percent by weight, | the glass having a luminous transmittance (LTA) of 25 to 40 percent for any one thickness in the range from 1 to 10 millimeters.

40. The article as in claim 39 wherein the total iron concentration is from about 1.083 to 1.11 weight percent, the FeO concentration is from about 0.306 to 0.35 weight percent, the CoO concentration is 90 to 128 PPM, the Se concentration is about 10 to 12 PPM, the $Cr_2O_3$ concentration is 286 to 302 PPM, and the $TiO_2$ concentration is 0.194 to 0.355 weight percent.

41. The article as in claim 40 wherein the glass has a total solar ultraviolet transmittance (TSUV) of about 25 percent or less, a total solar infrared transmittance (TSIR) of about 20 percent or less and a total solar energy transmittance (TSET) of about 30 percent or less.

42. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion comprising:

| | |
|---|---|
| total iron | about 0.6 to 4 percent by weight, |
| FeO | about 0.13 to 0.9 percent by weight, |
| CoO | about 40 to 178 PPM, |
| Se | about 5 to 70 PPM, |
| $TiO_2$ | about 0.02 to 1 percent by weight, |
| $Cr_2O_3$ | 0 to about 0.08 percent by weight, |
| $V_2O_5$ | 0 to about 0.32 percent by weight, |
| $MnO_2$ | 0 to about 0.5 percent by weight, |
| $SnO_2$ | 0 to about 2 percent by weight, |
| ZnO | 0 to about 0.5 percent by weight, |
| Mo | 0 to about 0.015 percent by weight, |
| $CeO_2$ | 0 to about 2 percent by weight, |
| NiO | 0 to about 0.1 percent by weight, | wherein the sum of the $Cr_2O_3$ concentration plus 25 percent of the $V_2O_5$ concentration is at least 0.0015 percent by weight, and the glass has a luminous transmittance (LTA) of up to 60 percent for any one thickness in the range from 1 to 10 millimeters.

43. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion comprising:

| | |
|---|---|
| total iron | 1 to less than 1.4 percent by weight, |
| FeO | about 0.2 to 0.6 percent by weight, |
| CoO | greater than 250 to about 450 PPM, |
| Se | about 5 to 70 PPM, |
| $TiO_2$ | 0 to about 1 percent by weight, |
| $Cr_2O_3$ | 0 to about 0.08 percent by weight, |
| $V_2O_5$ | 0 to about 0.32 percent by weight, |
| $MnO_2$ | 0 to about 0.5 percent by weight, |
| $SnO_2$ | 0 to about 2 percent by weight, |
| ZnO | 0 to about 0.5 percent by weight, |
| Mo | 0 to about 0.015 percent by weight, |
| $CeO_2$ | 0 to about 2 percent by weight, |
| NiO | 0 to about 0.1 percent by weight, | wherein the sum of the $Cr_2O_3$ concentration plus 25 percent of the $V_2O_5$ concentration is at least 0.0200 percent by weight, and the glass has a luminous transmittance (LTA) of up to 60 percent for any one thickness in the range from 1 to 10 millimeters.

44. A green colored, infrared and ultraviolet radiation absorbing glass article having a composition comprising a base glass portion comprising:

| | |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |

|   |   |
|---|---|
| $Al_2O_3$ | 0 to about 5 percent by weight, |
| $K_2O$ | 0 to about 5 percent by weight, | and a solar radiation absorbing and colorant portion comprising:

|   |   |
|---|---|
| total iron | about 0.60 to 4 percent by weight, |
| FeO | about 0.13 to 0.9 percent by weight, |
| CoO | about 40 to 178 PPM, |
| Se | about 5 to 70 PPM, |
| $Cr_2O_3$ | about 15 to 800 PPM, and |
| $TiO_2$ | about 0.02 to 1 percent by weight for | ultraviolet radiation absorption and for imparting a yellow color to the glass composition, wherein these solar radiation absorbing and colorant materials are balanced in amounts to obtain the green colored glass having a luminous transmittance (LTA) of up to about 60 percent and a total solar energy transmittance (TSET) of about 50 percent or less, a total solar ultraviolet transmittance (TSUV) of about 40 percent or less, and a total solar infrared transmittance (TSIR) of about 45 percent or less for any one thickness in the range from 1 to 10 millimeters.

45. A green colored, infrared and ultraviolet radiation absorbing glass article having a composition comprising a base glass portion comprising:

|   |   |
|---|---|
| $SiO_2$ | about 66 to 75 percent by weight, |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight, | and a solar radiation absorbing and colorant portion of major colorants consisting essentially of:

|   |   |
|---|---|
| total iron | about 0.60 to 4 percent by weight, |
| FeO | about 0.13 to 0.9 percent by weight, |
| CoO | greater than 250 to 500 PPM, |
| Se | about 5 to 70 PPM, |
| $Cr_2O_3$ | about 15 to 800 PPM, and |
| $TiO_2$ | about 0.02 to 1 percent by weight, | the glass having a luminous transmittance (LTA) of up to about 60 percent for any one thickness in the range from 1 to 10 millimeters.

46. The article as in claim 1 wherein the glass has a redox of 0.3232 to 0.4.

47. The article as in claim 1 wherein the luminous transmission is in the range of 25 to up to about 60%.

48. The article as in claim 1 wherein the total iron is in an amount in the range of 1.29 to 4 percent by weight.

49. The article as in claim 1 wherein the total iron is in an amount in the range of 0.6 to 1.03 percent by weight.

50. The article as in claim 1 wherein the FeO is in an amount in the range of 0.13 to 0.2183 percent by weight.

51. The article as in claim 1 wherein the FeO is in an amount in the range of 0.3493 to 0.9 percent by weight.

52. The article as in claim 13 wherein the $TiO_2$ is present in an amount in the range of 0.1000 to 1 weight percent.

\* \* \* \* \*